(12) United States Patent
Taylor et al.

(10) Patent No.: US 7,897,118 B2
(45) Date of Patent: *Mar. 1, 2011

(54) AIR CONDITIONER DEVICE WITH REMOVABLE DRIVER ELECTRODES

(75) Inventors: Charles E. Taylor, Punta Gorda, FL (US); Andrew J. Parker, Novato, CA (US); Igor Y. Botvinnik, Novato, CA (US); Shek Fai Lau, Foster City, CA (US); Gregory S. Snyder, San Francisco, CA (US); John Paul Reeves, Hong Kong (CN)

(73) Assignee: Sharper Image Acquisition LLC, New York, NY (US)

( * ) Notice: Subject to any disclaimer, the term of this patent is extended or adjusted under 35 U.S.C. 154(b) by 849 days.

This patent is subject to a terminal disclaimer.

(21) Appl. No.: 11/007,395

(22) Filed: Dec. 8, 2004

(65) Prior Publication Data

US 2006/0018076 A1      Jan. 26, 2006

Related U.S. Application Data

(60) Provisional application No. 60/590,688, filed on Jul. 23, 2004.

(51) Int. Cl.
*B01J 19/08* (2006.01)

(52) U.S. Cl. .................. 422/186; 96/15; 96/95; 96/97

(58) Field of Classification Search .......... 422/186; 96/15, 95, 97
See application file for complete search history.

(56) References Cited

U.S. PATENT DOCUMENTS

| | | |
|---|---|---|
| 653,421 A | 7/1900 | Lorey |
| 895,729 A | 8/1908 | Carlborg |
| 995,958 A | 6/1911 | Goldberg |
| 1,791,338 A | 2/1931 | Wintermute |
| 1,869,335 A | 7/1932 | Day |
| 1,882,949 A | 10/1932 | Ruder |
| 2,129,783 A | 9/1938 | Penney |
| 2,161,438 A * | 6/1939 | Terry .................. 237/78 R |
| 2,327,588 A | 8/1943 | Bennett |
| 2,359,057 A | 9/1944 | Skinner |

(Continued)

FOREIGN PATENT DOCUMENTS

CN           2111112 U         7/1972

(Continued)

OTHER PUBLICATIONS

U.S. Appl. No. 60/104,573, filed Oct. 16, 1998, Krichtafovitch.

(Continued)

*Primary Examiner*—Alexa D Neckel
*Assistant Examiner*—Xiuyu Tai
(74) *Attorney, Agent, or Firm*—Arent Fox LLP

(57) ABSTRACT

Embodiments of the present invention are directed to a method and apparatus for moving air using an air-conditioning system therein, whereby the air-conditioning system preferably includes at least one emitter electrode, at least one collector electrode, at least one driver electrode disposed adjacent to the collector electrode, and/or at least one trailing electrode positioned downstream of the collector electrode. The collector electrode and the driver electrode are removable from the device. In one embodiment, the driver electrodes are removable from the device and/or the collector electrode. The ability of remove the collector electrode as well as driver electrode allow for easy cleaning of the electrodes. In one embodiment, the present device includes a removable exhaust grill upon which the driver electrode and/or the trailing electrode are coupled to. The removable grill allows the user to easily clean the driver electrode without having to remove the collector electrode.

20 Claims, 14 Drawing Sheets

U.S. PATENT DOCUMENTS

| | | | |
|---|---|---|---|
| 2,509,548 A | 5/1950 | White | |
| 2,590,447 A | 3/1952 | Nord et al. | |
| 2,949,550 A | 8/1960 | Brown | |
| 2,978,066 A * | 4/1961 | Nodolf | 96/87 |
| 3,018,394 A | 1/1962 | Brown | |
| 3,022,430 A * | 2/1962 | Brown | 310/308 |
| 3,026,964 A | 3/1962 | Penney | |
| 3,374,941 A | 3/1968 | Okress | |
| 3,518,462 A | 6/1970 | Brown | |
| 3,540,191 A | 11/1970 | Herman | |
| 3,581,470 A | 6/1971 | Aitkenhead et al. | |
| 3,638,058 A | 1/1972 | Fritzius | |
| 3,744,216 A | 7/1973 | Halloran | |
| 3,806,763 A | 4/1974 | Masuda | |
| 3,892,927 A | 7/1975 | Lindenberg | |
| 3,945,813 A | 3/1976 | Iinoya et al. | |
| 3,958,960 A | 5/1976 | Bakke | |
| 3,958,961 A | 5/1976 | Bakke | |
| 3,958,962 A | 5/1976 | Hayashi | |
| 3,981,695 A | 9/1976 | Fuchs | |
| 3,984,215 A | 10/1976 | Zucker | |
| 3,988,131 A | 10/1976 | Kanazawa et al. | |
| 4,007,024 A | 2/1977 | Sallee et al. | |
| 4,052,177 A | 10/1977 | Kide | |
| 4,056,372 A | 11/1977 | Hayashi | |
| 4,070,163 A | 1/1978 | Kolb et al. | |
| 4,074,983 A | 2/1978 | Bakke | |
| 4,092,134 A | 5/1978 | Kikuchi | |
| 4,097,252 A | 6/1978 | Kirchhoff et al. | |
| 4,102,654 A | 7/1978 | Pellin | |
| 4,104,042 A | 8/1978 | Brozenick | |
| 4,110,086 A | 8/1978 | Schwab et al. | |
| 4,119,415 A | 10/1978 | Hayashi et al. | |
| 4,126,434 A | 11/1978 | Keiichi | |
| 4,138,233 A | 2/1979 | Masuda | |
| 4,147,522 A | 4/1979 | Gonas et al. | |
| 4,155,792 A | 5/1979 | Gelhaar et al. | |
| 4,171,975 A | 10/1979 | Kato et al. | |
| 4,185,971 A | 1/1980 | Isahaya | |
| 4,189,308 A | 2/1980 | Feldman | |
| 4,205,969 A | 6/1980 | Matsumoto | |
| 4,209,306 A | 6/1980 | Feldman et al. | |
| 4,218,225 A | 8/1980 | Kirchhoff et al. | |
| 4,225,323 A | 9/1980 | Zarchy et al. | |
| 4,227,894 A | 10/1980 | Proynoff | |
| 4,231,766 A | 11/1980 | Spurgin | |
| 4,232,355 A | 11/1980 | Finger et al. | |
| 4,244,710 A | 1/1981 | Burger | |
| 4,244,712 A | 1/1981 | Tongret | |
| 4,251,234 A | 2/1981 | Chang | |
| 4,253,852 A | 3/1981 | Adams | |
| 4,259,093 A | 3/1981 | Vlastos et al. | |
| 4,259,452 A | 3/1981 | Yukuta et al. | |
| 4,259,707 A | 3/1981 | Penney | |
| 4,264,343 A | 4/1981 | Natarajan et al. | |
| 4,266,948 A | 5/1981 | Teague et al. | |
| 4,282,014 A | 8/1981 | Winkler et al. | |
| 4,284,420 A | 8/1981 | Borysiak | |
| 4,289,504 A | 9/1981 | Scholes | |
| 4,293,319 A | 10/1981 | Claassen, Jr. | |
| 4,308,036 A | 12/1981 | Zahedi et al. | |
| 4,315,188 A | 2/1982 | Cerny et al. | |
| 4,318,718 A | 3/1982 | Utsumi et al. | |
| 4,338,560 A | 7/1982 | Lemley | |
| 4,342,571 A | 8/1982 | Hayashi | |
| 4,349,359 A | 9/1982 | Fitch et al. | |
| 4,351,648 A | 9/1982 | Penney | |
| 4,354,861 A | 10/1982 | Kalt | |
| 4,357,150 A | 11/1982 | Masuda et al. | |
| 4,362,632 A | 12/1982 | Jacob | |
| 4,363,072 A | 12/1982 | Coggins | |
| 4,366,525 A | 12/1982 | Baumgartner | |
| 4,369,776 A | 1/1983 | Roberts | |
| 4,375,364 A | 3/1983 | Van Hoesen et al. | |
| 4,380,900 A | 4/1983 | Linder et al. | |
| 4,386,395 A | 5/1983 | Francis, Jr. | |
| 4,391,614 A | 7/1983 | Rozmus | |
| 4,394,239 A | 7/1983 | Kitzelmann et al. | |
| 4,405,342 A | 9/1983 | Bergman | |
| 4,406,671 A | 9/1983 | Rozmus | |
| 4,412,850 A | 11/1983 | Kurata et al. | |
| 4,413,225 A | 11/1983 | Donig et al. | |
| 4,414,603 A | 11/1983 | Masuda | |
| 4,435,190 A | 3/1984 | Taillet et al. | |
| 4,440,552 A | 4/1984 | Uchiya et al. | |
| 4,443,234 A | 4/1984 | Carlsson | |
| 4,445,911 A | 5/1984 | Lind | |
| 4,477,263 A | 10/1984 | Shaver et al. | |
| 4,477,268 A | 10/1984 | Kalt | |
| 4,481,017 A | 11/1984 | Furlong | |
| 4,496,375 A | 1/1985 | Levantine | |
| 4,502,002 A | 2/1985 | Ando | |
| 4,505,724 A | 3/1985 | Baab | |
| 4,509,958 A | 4/1985 | Masuda et al. | |
| 4,514,780 A | 4/1985 | Brussee et al. | |
| 4,515,982 A | 5/1985 | Lechtken et al. | |
| 4,516,991 A | 5/1985 | Kawashima | |
| 4,521,229 A | 6/1985 | Baker et al. | |
| 4,522,634 A | 6/1985 | Frank | |
| 4,534,776 A | 8/1985 | Mammel et al. | |
| 4,536,698 A | 8/1985 | Shevalenko et al. | |
| 4,544,382 A | 10/1985 | Taillet et al. | |
| 4,555,252 A | 11/1985 | Eckstein | |
| 4,569,684 A | 2/1986 | Ibbott | |
| 4,582,961 A | 4/1986 | Frederiksen | |
| 4,587,475 A | 5/1986 | Finney, Jr. et al. | |
| 4,588,423 A | 5/1986 | Gillingham et al. | |
| 4,590,042 A | 5/1986 | Drage | |
| 4,597,780 A | 7/1986 | Reif | |
| 4,597,781 A | 7/1986 | Spector | |
| 4,600,411 A | 7/1986 | Santamaria | |
| 4,601,733 A | 7/1986 | Ordines et al. | |
| 4,604,174 A | 8/1986 | Bollinger et al. | |
| 4,614,573 A | 9/1986 | Masuda | |
| 4,623,365 A | 11/1986 | Bergman | |
| 4,626,261 A | 12/1986 | Jorgensen | |
| 4,632,135 A | 12/1986 | Lenting et al. | |
| 4,632,746 A | 12/1986 | Bergman | |
| 4,636,981 A | 1/1987 | Ogura | |
| 4,643,744 A | 2/1987 | Brooks | |
| 4,643,745 A | 2/1987 | Sakakibara et al. | |
| 4,647,836 A | 3/1987 | Olsen | |
| 4,650,648 A | 3/1987 | Beer et al. | |
| 4,656,010 A | 4/1987 | Leitzke et al. | |
| 4,657,738 A | 4/1987 | Kanter et al. | |
| 4,659,342 A | 4/1987 | Lind | |
| 4,662,903 A | 5/1987 | Yanagawa | |
| 4,666,474 A | 5/1987 | Cook | |
| 4,668,479 A | 5/1987 | Manabe et al. | |
| 4,670,026 A | 6/1987 | Hoenig | |
| 4,673,416 A * | 6/1987 | Sakakibara et al. | 96/79 |
| 4,674,003 A | 6/1987 | Zylka | |
| 4,680,496 A | 7/1987 | Letournel et al. | |
| 4,686,370 A | 8/1987 | Blach | |
| 4,689,056 A | 8/1987 | Noguchi et al. | |
| 4,691,829 A | 9/1987 | Auer | |
| 4,692,174 A | 9/1987 | Gelfand et al. | |
| 4,693,869 A | 9/1987 | Pfaff | |
| 4,694,376 A | 9/1987 | Gesslauer | |
| 4,702,752 A | 10/1987 | Yanagawa | |
| 4,713,092 A | 12/1987 | Kikuchi et al. | |
| 4,713,093 A | 12/1987 | Hansson | |
| 4,713,724 A | 12/1987 | Voelkel | |
| 4,715,870 A | 12/1987 | Masuda et al. | |

| | | | | | | |
|---|---|---|---|---|---|---|
| 4,725,289 A | 2/1988 | Quintilian | 5,199,257 A | 4/1993 | Colletta et al. | |
| 4,726,812 A | 2/1988 | Hirth | 5,210,678 A | 5/1993 | Lain et al. | |
| 4,726,814 A | 2/1988 | Weitman | 5,215,558 A * | 6/1993 | Moon .......................... | 96/62 |
| 4,736,127 A | 4/1988 | Jacobsen | 5,217,504 A | 6/1993 | Johansson | |
| 4,743,275 A | 5/1988 | Flanagan | 5,217,511 A | 6/1993 | Plaks et al. | |
| 4,749,390 A | 6/1988 | Burnett et al. | 5,234,555 A | 8/1993 | Ibbott | |
| 4,750,921 A | 6/1988 | Sugita et al. | 5,248,324 A | 9/1993 | Hara | |
| 4,760,302 A | 7/1988 | Jacobsen | 5,250,267 A | 10/1993 | Johnson et al. | |
| 4,760,303 A | 7/1988 | Miyake | 5,254,155 A | 10/1993 | Mensi | |
| 4,765,802 A | 8/1988 | Gombos et al. | 5,266,004 A | 11/1993 | Tsumurai et al. | |
| 4,771,361 A | 9/1988 | Varga | 5,271,763 A | 12/1993 | Jang | |
| 4,772,297 A | 9/1988 | Anzai | 5,282,891 A | 2/1994 | Durham | |
| 4,779,182 A | 10/1988 | Mickal et al. | 5,290,343 A | 3/1994 | Morita et al. | |
| 4,781,736 A | 11/1988 | Cheney et al. | 5,296,019 A | 3/1994 | Oakley et al. | |
| 4,786,844 A | 11/1988 | Farrell et al. | 5,302,190 A | 4/1994 | Williams | |
| 4,789,801 A | 12/1988 | Lee | 5,308,586 A | 5/1994 | Fritsche et al. | |
| 4,808,200 A | 2/1989 | Dallhammer et al. | 5,315,838 A | 5/1994 | Thompson | |
| 4,811,159 A | 3/1989 | Foster, Jr. | 5,316,741 A | 5/1994 | Sewell et al. | |
| 4,822,381 A | 4/1989 | Mosley et al. | 5,330,559 A | 7/1994 | Cheney et al. | |
| 4,853,005 A | 8/1989 | Jaisinghani et al. | 5,348,571 A | 9/1994 | Weber | |
| 4,869,736 A | 9/1989 | Ivester et al. | 5,376,168 A | 12/1994 | Inculet | |
| 4,892,713 A | 1/1990 | Newman | 5,378,978 A | 1/1995 | Gallo et al. | |
| 4,929,139 A | 5/1990 | Vorreiter et al. | 5,386,839 A | 2/1995 | Chen | |
| 4,940,470 A | 7/1990 | Jaisinghani et al. | 5,395,430 A | 3/1995 | Lundgren et al. | |
| 4,940,894 A | 7/1990 | Morters | 5,401,301 A | 3/1995 | Schulmerich et al. | |
| 4,941,068 A | 7/1990 | Hofmann | 5,401,302 A | 3/1995 | Schulmerich et al. | |
| 4,941,224 A | 7/1990 | Saeki et al. | 5,403,383 A | 4/1995 | Jaisinghani | |
| 4,944,778 A | 7/1990 | Yanagawa | 5,405,434 A | 4/1995 | Inculet | |
| 4,954,320 A | 9/1990 | Birmingham et al. | 5,407,469 A | 4/1995 | Sun | |
| 4,955,991 A | 9/1990 | Torok et al. | 5,407,639 A | 4/1995 | Watanabe et al. | |
| 4,966,666 A | 10/1990 | Waltonen | 5,417,936 A | 5/1995 | Suzuki et al. | |
| 4,967,119 A | 10/1990 | Torok et al. | 5,419,953 A | 5/1995 | Chapman | |
| 4,976,752 A | 12/1990 | Torok et al. | 5,433,772 A | 7/1995 | Sikora | |
| 4,978,372 A | 12/1990 | Pick | 5,435,817 A | 7/1995 | Davis et al. | |
| D315,598 S | 3/1991 | Yamamoto et al. | 5,435,978 A | 7/1995 | Yokomi | |
| 5,003,774 A | 4/1991 | Leonard | 5,437,713 A | 8/1995 | Chang | |
| 5,006,761 A | 4/1991 | Torok et al. | 5,437,843 A | 8/1995 | Kuan | |
| 5,010,869 A | 4/1991 | Lee | 5,445,798 A | 8/1995 | Ikeda et al. | |
| 5,012,093 A | 4/1991 | Shimizu | 5,466,279 A | 11/1995 | Hattori et al. | |
| 5,012,094 A | 4/1991 | Hamade | 5,468,454 A | 11/1995 | Kim | |
| 5,012,159 A | 4/1991 | Torok et al. | 5,474,599 A | 12/1995 | Cheney et al. | |
| 5,022,979 A | 6/1991 | Hijikata et al. | 5,484,472 A | 1/1996 | Weinberg | |
| 5,024,685 A | 6/1991 | Torok et al. | 5,484,473 A | 1/1996 | Bontempi | |
| 5,030,254 A | 7/1991 | Heyen et al. | 5,492,678 A | 2/1996 | Ota et al. | |
| 5,034,033 A | 7/1991 | Alsup et al. | 5,501,844 A | 3/1996 | Kasting, Jr. et al. | |
| 5,037,456 A | 8/1991 | Yu | 5,503,808 A | 4/1996 | Garbutt et al. | |
| 5,045,095 A | 9/1991 | You | 5,503,809 A | 4/1996 | Coate et al. | |
| 5,053,912 A | 10/1991 | Loreth et al. | 5,505,914 A | 4/1996 | Tona-Serra | |
| 5,059,219 A | 10/1991 | Plaks et al. | 5,508,008 A | 4/1996 | Wasser | |
| 5,061,462 A | 10/1991 | Suzuki | 5,514,345 A | 5/1996 | Garbutt et al. | |
| 5,066,313 A | 11/1991 | Mallory, Sr. | 5,516,493 A | 5/1996 | Bell et al. | |
| 5,072,746 A | 12/1991 | Kantor | 5,518,531 A | 5/1996 | Joannu | |
| 5,076,820 A | 12/1991 | Gurvitz | 5,520,887 A | 5/1996 | Shimizu et al. | |
| 5,077,468 A | 12/1991 | Hamade | 5,525,310 A | 6/1996 | Decker et al. | |
| 5,077,500 A | 12/1991 | Torok et al. | 5,529,613 A | 6/1996 | Yavnieli | |
| 5,100,440 A | 3/1992 | Stahel et al. | 5,529,760 A | 6/1996 | Burris | |
| RE33,927 E | 5/1992 | Fuzimura | 5,532,798 A | 7/1996 | Nakagami et al. | |
| D326,514 S | 5/1992 | Alsup et al. | 5,535,089 A | 7/1996 | Ford et al. | |
| 5,118,942 A | 6/1992 | Hamade | 5,536,477 A | 7/1996 | Cha et al. | |
| 5,125,936 A | 6/1992 | Johansson | 5,538,695 A | 7/1996 | Shinjo et al. | |
| 5,136,461 A | 8/1992 | Zellweger | 5,540,761 A | 7/1996 | Yamamoto | |
| 5,137,546 A | 8/1992 | Steinbacher et al. | 5,542,967 A | 8/1996 | Ponizovsky et al. | |
| 5,141,529 A | 8/1992 | Oakley et al. | 5,545,379 A | 8/1996 | Gray | |
| 5,141,715 A | 8/1992 | Sackinger et al. | 5,545,380 A | 8/1996 | Gray | |
| D329,284 S | 9/1992 | Patton | 5,547,643 A | 8/1996 | Nomoto et al. | |
| 5,147,429 A | 9/1992 | Bartholomew et al. | 5,549,874 A | 8/1996 | Kimiya et al. | |
| 5,154,733 A | 10/1992 | Fujii et al. | 5,554,344 A | 9/1996 | Duarte | |
| 5,158,580 A | 10/1992 | Chang | 5,554,345 A | 9/1996 | Kitchenman | |
| D332,655 S | 1/1993 | Lytle et al. | 5,569,368 A | 10/1996 | Larsky et al. | |
| 5,180,404 A | 1/1993 | Loreth et al. | 5,569,437 A | 10/1996 | Stiehl et al. | |
| 5,183,480 A | 2/1993 | Raterman et al. | D375,546 S | 11/1996 | Lee | |
| 5,196,171 A | 3/1993 | Peltier | 5,571,483 A | 11/1996 | Pfingstl et al. | |
| 5,198,003 A | 3/1993 | Haynes | 5,573,577 A | 11/1996 | Joannou | |

| Patent Number | Date | Inventor |
|---|---|---|
| 5,573,730 A | 11/1996 | Gillum |
| 5,578,112 A | 11/1996 | Krause |
| 5,578,280 A | 11/1996 | Kazi et al. |
| 5,582,632 A | 12/1996 | Nohr et al. |
| 5,587,131 A | 12/1996 | Malkin et al. |
| D377,523 S | 1/1997 | Marvin et al. |
| 5,591,253 A | 1/1997 | Altman et al. |
| 5,591,334 A | 1/1997 | Shimizu et al. |
| 5,591,412 A | 1/1997 | Jones et al. |
| 5,593,476 A | 1/1997 | Coppom |
| 5,601,636 A | 2/1997 | Glucksman |
| 5,603,752 A | 2/1997 | Hara |
| 5,603,893 A | 2/1997 | Gundersen et al. |
| 5,614,002 A | 3/1997 | Chen |
| 5,624,476 A | 4/1997 | Eyraud |
| 5,630,866 A | 5/1997 | Gregg |
| 5,630,990 A | 5/1997 | Conrad et al. |
| 5,637,198 A | 6/1997 | Breault |
| 5,637,279 A | 6/1997 | Besen et al. |
| 5,641,342 A | 6/1997 | Smith et al. |
| 5,641,461 A | 6/1997 | Ferone |
| 5,647,890 A | 7/1997 | Yamamoto |
| 5,648,049 A | 7/1997 | Jones et al. |
| 5,655,210 A | 8/1997 | Gregoire et al. |
| 5,656,063 A | 8/1997 | Hsu |
| 5,665,147 A | 9/1997 | Taylor et al. |
| 5,667,563 A | 9/1997 | Silva, Jr. |
| 5,667,564 A | 9/1997 | Weinberg |
| 5,667,565 A | 9/1997 | Gondar |
| 5,667,756 A | 9/1997 | Ho |
| 5,669,963 A | 9/1997 | Horton et al. |
| 5,678,237 A | 10/1997 | Powell et al. |
| 5,681,434 A | 10/1997 | Eastlund |
| 5,681,533 A | 10/1997 | Hiromi |
| 5,698,164 A | 12/1997 | Kishioka et al. |
| 5,702,507 A * | 12/1997 | Wang ............................ 96/55 |
| D389,567 S | 1/1998 | Gudefin |
| 5,766,318 A | 6/1998 | Loreth et al. |
| 5,779,769 A | 7/1998 | Jiang |
| 5,814,135 A | 9/1998 | Weinberg |
| 5,879,435 A | 3/1999 | Satyapal et al. |
| 5,893,977 A | 4/1999 | Pucci |
| 5,902,552 A * | 5/1999 | Brickley .................... 422/121 |
| 5,911,957 A | 6/1999 | Khatchatrian et al. |
| 5,972,076 A | 10/1999 | Nichols et al. |
| 5,975,090 A | 11/1999 | Taylor et al. |
| 5,980,614 A | 11/1999 | Loreth et al. |
| 5,993,521 A | 11/1999 | Loreth et al. |
| 5,997,619 A | 12/1999 | Knuth et al. |
| 6,019,815 A | 2/2000 | Satyapal et al. |
| 6,042,637 A | 3/2000 | Weinberg |
| 6,063,168 A | 5/2000 | Nichols et al. |
| 6,086,657 A | 7/2000 | Freije |
| 6,117,216 A | 9/2000 | Loreth |
| 6,118,645 A | 9/2000 | Partridge |
| 6,126,722 A | 10/2000 | Mitchell et al. |
| 6,126,727 A | 10/2000 | Lo |
| 6,149,717 A | 11/2000 | Satyapal et al. |
| 6,149,815 A | 11/2000 | Sauter |
| 6,152,146 A | 11/2000 | Taylor et al. |
| 6,163,098 A | 12/2000 | Taylor et al. |
| 6,176,977 B1 | 1/2001 | Taylor et al. |
| 6,182,461 B1 | 2/2001 | Washburn et al. |
| 6,182,671 B1 | 2/2001 | Taylor et al. |
| 6,193,852 B1 | 2/2001 | Caracciolo et al. |
| 6,203,600 B1 | 3/2001 | Loreth |
| 6,212,883 B1 | 4/2001 | Kang |
| 6,228,149 B1 | 5/2001 | Alenichev et al. |
| 6,252,012 B1 | 6/2001 | Egitto et al. |
| 6,270,733 B1 | 8/2001 | Rodden |
| 6,277,248 B1 | 8/2001 | Ishioka et al. |
| 6,282,106 B2 | 8/2001 | Grass |
| D449,097 S | 10/2001 | Smith et al. |
| D449,679 S | 10/2001 | Smith et al. |
| 6,296,692 B1 | 10/2001 | Gutmann |
| 6,302,944 B1 | 10/2001 | Hoenig |
| 6,309,514 B1 | 10/2001 | Conrad et al. |
| 6,312,507 B1 | 11/2001 | Taylor et al. |
| 6,315,821 B1 | 11/2001 | Pillion et al. |
| 6,328,791 B1 | 12/2001 | Pillion et al. |
| 6,348,103 B1 | 2/2002 | Ahlborn et al. |
| 6,350,417 B1 | 2/2002 | Lau et al. |
| 6,362,604 B1 | 3/2002 | Cravey |
| 6,372,097 B1 | 4/2002 | Chen |
| 6,373,723 B1 | 4/2002 | Wallgren et al. |
| 6,379,427 B1 | 4/2002 | Siess |
| 6,391,259 B1 | 5/2002 | Malkin et al. |
| 6,398,852 B1 | 6/2002 | Loreth |
| 6,447,587 B1 | 9/2002 | Pillion et al. |
| 6,451,266 B1 | 9/2002 | Lau et al. |
| 6,464,754 B1 | 10/2002 | Ford |
| 6,471,753 B1 | 10/2002 | Ahn et al. |
| 6,494,940 B1 | 12/2002 | Hak |
| 6,504,308 B1 | 1/2003 | Krichtafovitch et al. |
| 6,508,982 B1 | 1/2003 | Shoji |
| 6,544,485 B1 | 4/2003 | Taylor |
| 6,585,935 B1 | 7/2003 | Taylor et al. |
| 6,588,434 B2 | 7/2003 | Taylor et al. |
| 6,603,268 B2 | 8/2003 | Lee |
| 6,613,277 B1 | 9/2003 | Monagan |
| 6,632,407 B1 | 10/2003 | Lau et al. |
| 6,635,105 B2 | 10/2003 | Ahlborn et al. |
| 6,672,315 B2 | 1/2004 | Taylor et al. |
| 6,709,484 B2 | 3/2004 | Lau et al. |
| 6,713,026 B2 | 3/2004 | Taylor et al. |
| 6,735,830 B1 | 5/2004 | Merciel |
| 6,749,667 B2 | 6/2004 | Reeves et al. |
| 6,753,652 B2 | 6/2004 | Kim |
| 6,761,796 B2 | 7/2004 | Srivastava et al. |
| 6,761,108 B2 | 7/2004 | Hirano et al. |
| 6,768,110 B2 | 7/2004 | Alani |
| 6,768,120 B2 | 7/2004 | Leung et al. |
| 6,768,121 B2 | 7/2004 | Horsky |
| 6,770,878 B2 | 8/2004 | Uhlemann et al. |
| 6,774,359 B1 | 8/2004 | Hirabayashi et al. |
| 6,777,686 B2 | 8/2004 | Olson et al. |
| 6,777,699 B2 | 8/2004 | Miley et al. |
| 6,777,882 B2 | 8/2004 | Goldberg et al. |
| 6,781,136 B1 | 8/2004 | Kato |
| 6,785,912 B1 | 9/2004 | Julio |
| 6,791,814 B2 | 9/2004 | Adachi et al. |
| 6,794,661 B2 | 9/2004 | Tsukihara et al. |
| 6,797,339 B2 | 9/2004 | Akizuki et al. |
| 6,797,964 B2 | 9/2004 | Yamashita |
| 6,799,068 B1 | 9/2004 | Hartmann et al. |
| 6,800,862 B2 | 10/2004 | Matsumoto et al. |
| 6,803,585 B2 | 10/2004 | Glukhoy |
| 6,805,916 B2 | 10/2004 | Cadieu |
| 6,806,035 B1 | 10/2004 | Atireklapvarodom et al. |
| 6,806,163 B2 | 10/2004 | Wu et al. |
| 6,806,468 B2 | 10/2004 | Laiko et al. |
| 6,808,606 B2 | 10/2004 | Thomsen et al. |
| 6,809,310 B2 | 10/2004 | Chen |
| 6,809,312 B1 | 10/2004 | Park et al. |
| 6,809,325 B2 | 10/2004 | Dahl et al. |
| 6,812,647 B2 | 11/2004 | Cornelius |
| 6,815,690 B2 | 11/2004 | Veerasamy et al. |
| 6,818,257 B2 | 11/2004 | Amann et al. |
| 6,818,909 B2 | 11/2004 | Murrell et al. |
| 6,819,053 B2 | 11/2004 | Johnson |
| 6,863,869 B2 | 3/2005 | Taylor et al. |
| 6,896,853 B2 | 5/2005 | Law et al. |
| 6,911,186 B2 | 6/2005 | Taylor et al. |
| 7,038,579 B2 * | 5/2006 | Hosoe et al. ................. 340/439 |
| 7,311,762 B2 * | 12/2007 | Taylor et al. ................... 96/39 |
| 2001/0048906 A1 | 12/2001 | Lau et al. |

| | | | |
|---|---|---|---|
| 2002/0069760 A1 | 6/2002 | Pruette et al. | |
| 2002/0079212 A1 | 6/2002 | Taylor et al. | |
| 2002/0098131 A1 | 7/2002 | Taylor et al. | |
| 2002/0122751 A1 | 9/2002 | Sinaiko et al. | |
| 2002/0122752 A1 | 9/2002 | Taylor et al. | |
| 2002/0127156 A1 | 9/2002 | Taylor | |
| 2002/0134664 A1 | 9/2002 | Taylor et al. | |
| 2002/0134665 A1 | 9/2002 | Taylor et al. | |
| 2002/0141914 A1 | 10/2002 | Lau et al. | |
| 2002/0144601 A1 | 10/2002 | Palestro et al. | |
| 2002/0146356 A1 | 10/2002 | Sinaiko et al. | |
| 2002/0150520 A1 | 10/2002 | Taylor et al. | |
| 2002/0152890 A1 | 10/2002 | Leiser | |
| 2002/0155041 A1* | 10/2002 | McKinney et al. | 422/186.04 |
| 2002/0170435 A1 | 11/2002 | Joannou | |
| 2002/0190658 A1 | 12/2002 | Lee | |
| 2002/0195951 A1 | 12/2002 | Lee | |
| 2003/0005824 A1 | 1/2003 | Katou et al. | |
| 2003/0170150 A1 | 9/2003 | Law et al. | |
| 2003/0206837 A1 | 11/2003 | Taylor et al. | |
| 2003/0206839 A1 | 11/2003 | Taylor et al. | |
| 2003/0206840 A1 | 11/2003 | Taylor et al. | |
| 2004/0033176 A1 | 2/2004 | Lee et al. | |
| 2004/0052700 A1 | 3/2004 | Kotlyar et al. | |
| 2004/0065202 A1 | 4/2004 | Gatchell et al. | |
| 2004/0096376 A1 | 5/2004 | Taylor | |
| 2004/0136863 A1 | 7/2004 | Yates et al. | |
| 2004/0166037 A1 | 8/2004 | Youdell et al. | |
| 2004/0226447 A1 | 11/2004 | Lau et al. | |
| 2004/0234431 A1 | 11/2004 | Taylor et al. | |
| 2004/0237787 A1 | 12/2004 | Reeves et al. | |
| 2004/0251124 A1 | 12/2004 | Lau | |
| 2004/0251909 A1 | 12/2004 | Taylor et al. | |
| 2005/0000793 A1 | 1/2005 | Taylor et al. | |
| 2006/0018811 A1* | 1/2006 | Taylor et al. | 422/186.04 |

FOREIGN PATENT DOCUMENTS

| | | |
|---|---|---|
| CN | 87210843 U | 7/1988 |
| CN | 2138764 Y | 6/1993 |
| CN | 2153231 Y | 12/1993 |
| DE | 2206057 | 8/1973 |
| DE | 197 41 621 C 1 | 6/1999 |
| EP | 0433152 A1 | 12/1990 |
| EP | 0332624 B1 | 1/1992 |
| FR | 2690509 | 10/1993 |
| GB | 643363 | 9/1950 |
| JP | S51-90077 | 8/1976 |
| JP | S62-20653 | 2/1987 |
| JP | S63-164948 | 10/1988 |
| JP | 10137007 | 5/1998 |
| JP | 11104223 | 4/1999 |
| JP | 2000236914 | 9/2000 |
| WO | WO 92/05875 A1 | 4/1992 |
| WO | WO 96/04703 A1 | 2/1996 |
| WO | WO 99/07474 A1 | 2/1999 |
| WO | WO 00/10713 A1 | 3/2000 |
| WO | WO 01/47803 A1 | 7/2001 |
| WO | WO 01/48781 A1 | 7/2001 |
| WO | WO 01/64349 A1 | 9/2001 |
| WO | WO 01/85348 A2 | 11/2001 |
| WO | WO 02/20162 A2 | 3/2002 |
| WO | WO 02/20163 A2 | 3/2002 |
| WO | WO 02/30574 A1 | 4/2002 |
| WO | WO 02/32578 A1 | 4/2002 |
| WO | WO 02/42003 A1 | 5/2002 |
| WO | WO 02/066167 A1 | 8/2002 |
| WO | WO 03/009944 A1 | 2/2003 |
| WO | WO 03/013620 A1 | 2/2003 |
| WO | WO 03/013734 AA | 2/2003 |

OTHER PUBLICATIONS

U.S. Appl. No. 60/306,479, filed Jul. 18, 2001, Taylor.
U.S. Appl. No. 60/341,179, filed Dec. 13, 2001, Taylor et al.
U.S. Appl. No. 60/340,702, filed Dec. 13, 2001, Taylor et al.
U.S. Appl. No. 60/341,377, filed Dec. 13, 2001, Taylor et al.
U.S. Appl. No. 60/341,518, filed Dec. 13, 2001, Taylor.
U.S. Appl. No. 60/340,288, filed Dec. 13, 2001, Taylor.
U.S. Appl. No. 60/341,176, filed Dec. 13, 2001, Taylor.
U.S. Appl. No. 60/340,462, filed Dec. 13, 2001, Taylor.
U.S. Appl. No. 60/340,090, filed Dec. 13, 2001, Taylor.
U.S. Appl. No. 60/341,433, filed Dec. 13, 2001, Taylor.
U.S. Appl. No. 60/341,592, filed Dec. 13, 2001, Taylor.
U.S. Appl. No. 60/341,320, filed Dec. 13, 2001, Taylor.
U.S. Appl. No. 60/391,070, filed Jun. 6, 2002, Reeves.
Blueair AV 402 Air Purifier, http://www.air-purifiers-usa.biz/Blueair_AV402.htm, 4 pp., 1996.
Blueair AV 501 Air Purifier, http://www.air-purifiers-usa.biz/Blueair_AV501.htm, 15 pp., 1997.
ConsumerReports.org, "Air Cleaners: Behind the Hype," http://www.consumerreports.org/main/content/printable.jsp?Folder%3C%3EFOLDER_id, Oct. 2003, 6 pp.
Electrical schematic and promotional material available from Zenion Industries, 7 pages, Aug. 1990.
English Translation of German Patent Document DE 197 41 621 C1; Publication Date: Jun. 10, 1999.
English Translation of German Published Patent Application 2206057; Publication Date: Aug. 16, 1973.
English Translation of Japanese Unexamined Patent Application Bulletin No. S51-90077; Publication Date: Aug. 6, 1976.
English Translation of Japanese Unexamined Utility Model Application No. S62-20653; Publication Date: Feb. 7, 1987.
English Translation of Japanese Unexamined Utility Model Application No. S63-164948; Publication Date: Oct. 27, 1988.
Friedrich C-90A Electronic Air Cleaner, Service Information, Friedrich Air Conditioning Co., 12 pp., 1985.
"Household Air Cleaners," Consumer Reports Magazine, Oct. 1992, 6 pp.
LakeAir Excel and Maxum Portable Electronic Air Cleaners, Operating and Service Manual, LakeAir International, Inc., 11 pp., 1971.
LENTEK Sila™ Plug-In Air Purifier/Deodorizer product box copyrighted 1999, 13 pages.
Promotional material available from Zenion Industries for the Plasma-Pure 100/200/300, 2 pages, Aug. 1990.
Promotional material available from Zenion Industries for the Plasma-Tron, 2 pages, Aug. 1990.
Trion 120 Air Purifier, Model 442501-025, http://www.feddersoutled.com/trion120.html, 16 pp., believed to be at least one year prior to Nov. 5, 1998.
Trion 150 Air Purifier, Model 45000-002, http://www.feddersoutlet.com/trion150.html, 11 pp., believed to be at least one year prior to Nov. 5, 1998.
Trion 350 Air Purifier, Model 450111-010, http://www.feddersoutlet.com/trion350.html, 12 pp., believed to be at least one year prior to Nov. 5, 1998.
Trion Console 250 Electronic Air Cleaner, Model Series 442857 and 445600, Manual for Installation•Operation•Maintenance, Trion Inc., 7 pp., believed to be at least one year prior to Nov. 5, 1998.

* cited by examiner

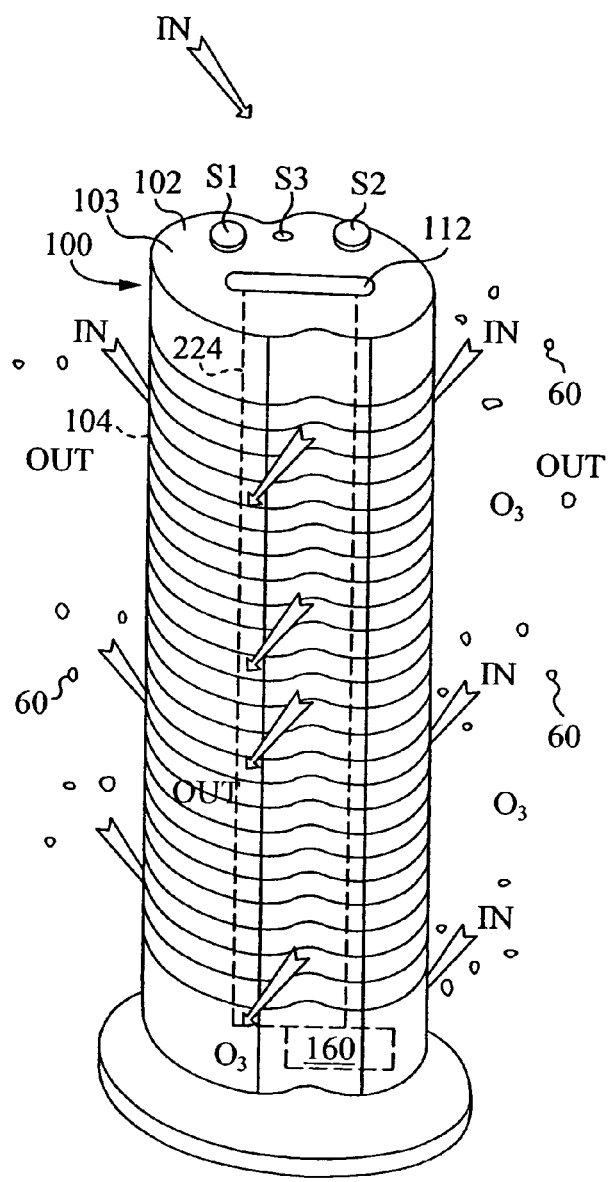
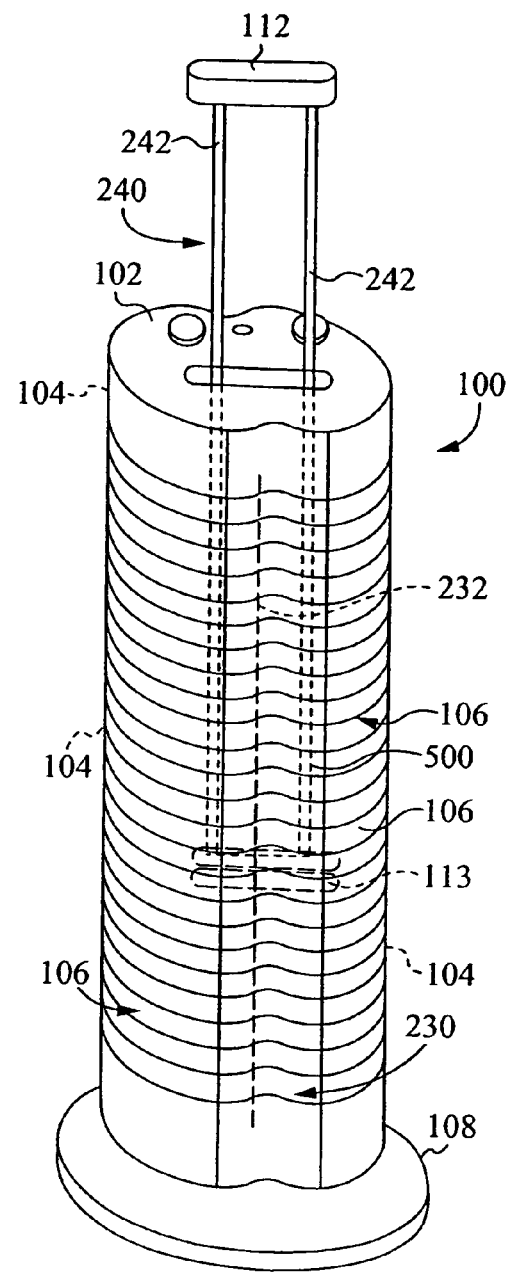
*Fig. 2A*  *Fig. 2B*

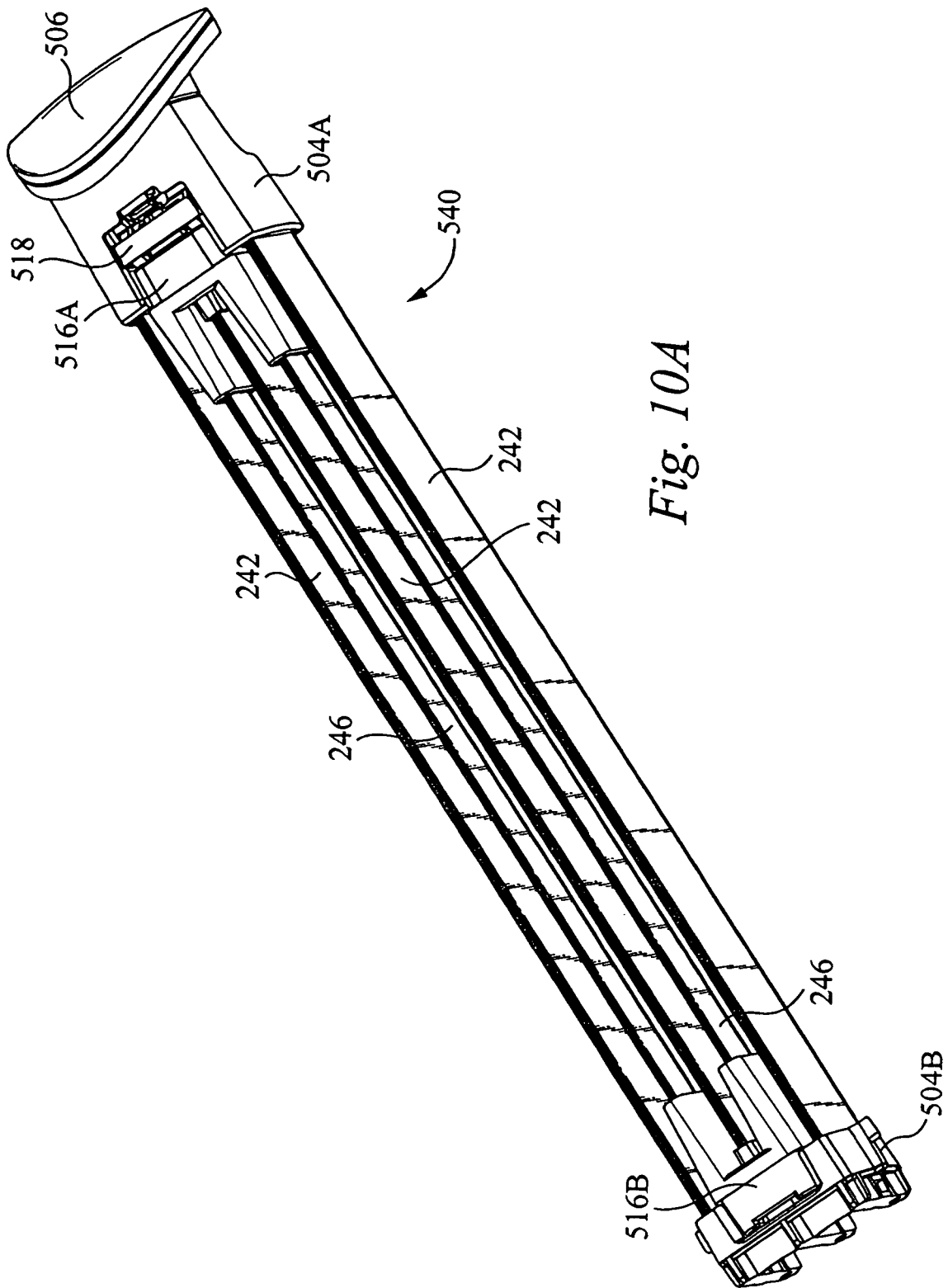

AIR CONDITIONER DEVICE WITH REMOVABLE DRIVER ELECTRODES

CLAIM OF PRIORITY

The present application claims priority under 35 U.S.C. 119(e) to U.S. Provisional Patent Application No. 60/590, 688, filed Jul. 23, 2004, entitled "Air Conditioner Device With Removable Driver Electrodes" (now expired), which is hereby incorporated herein by reference.

CROSS-REFERENCE APPLICATIONS

The present invention is related to the following patent applications and patents, each of which is incorporated herein by reference:

U.S. patent application Ser. No. 10/074,207, filed Feb. 12, 2002, entitled "Electro-Kinetic Air Transporter-Conditioner Devices with Interstitial Electrode" (now abandoned);

U.S. Pat. No. 6,176,977, entitled "Electro-Kinetic Air Transporter-Conditioner";

U.S. Pat. No. 6,544,485, entitled "Electro-Kinetic Device with Anti Microorganism Capability";

U.S. patent application Ser. No. 10/074,347, filed Feb. 12, 2002, entitled "Electro-Kinetic Air Transporter-Conditioner Device with Enhanced Housing", now U.S. Pat. No. 6,911, 186;

U.S. patent application Ser. No. 10/717,420, filed Nov. 19, 2003, entitled "Electro-Kinetic Air Transporter And Conditioner Devices With Insulated Driver Electrodes" (now abandoned);

U.S. patent application Ser. No. 10/625,401, filed Jul. 23, 2003, entitled "Electro-Kinetic Air Transporter And Conditioner Devices With Enhanced Arcing Detection And Suppression Features", now U.S. Pat. No. 6,984,987;

U.S. Pat. No. 6,350,417 issued May 4, 2000, entitled "Electrode Self Cleaning Mechanism For Electro-Kinetic Air Transporter-Conditioner";

U.S. Pat. No. 6,709,484, issued Mar. 23, 2004, entitled "Electrode Self-Cleaning Mechanism For Electro-Kinetic Air Transporter Conditioner Devices;

U.S. Pat. No. 6,350,417 issued May 4, 2000, and entitled "Electrode Self Cleaning Mechanism For Electro-Kinetic Air Transporter-Conditioner";

U.S. Patent Application No. 60/590,735, filed Jul. 23, 2004, entitled "Air Conditioner Device With Variable Voltage Controlled Trailing Electrodes" (now expired);

U.S. Patent Application No. 60/590,960, filed Jul. 23, 2004, entitled "Air Conditioner Device With Individually Removable Driver Electrodes" (now expired);

U.S. Patent Application No. 60/590,445, filed Jul. 23, 2004, entitled "Air Conditioner Device With Enhanced Germicidal Lamp" (now expired);

U.S. patent application Ser. No. 11/004,397, filed Dec. 3, 2004, entitled "Air Conditioner Device With Enhanced Germicidal Lamp" (now abandoned);

U.S. patent application Ser. No. 11/006,344, filed Dec. 7, 2004, entitled "Air Conditioner Device With Removable Driver Electrodes" (now abandoned);

U.S. patent application Ser. No. 11/003,034, filed Dec. 3, 2004, entitled "Air Conditioner Device With Removable Driver Electrodes" (now abandoned);

U.S. patent application Ser. No. 11/003,671, filed Dec. 3, 2004, entitled "Air Conditioner Device With Variable Voltage Controlled Trailing Electrodes" (now abandoned);

U.S. patent application Ser. No. 11/003,516, filed Dec. 3, 2004, entitled "Air Conditioner Device With Individually Removable Driver Electrodes" (now abandoned);

U.S. patent application Ser. No. 11/003,032, filed Dec. 3, 2004, entitled "Air Conditioner Device With Enhanced Germicidal Lamp" (now abandoned); and U.S. patent application Ser. No. 11/003,894, filed Dec. 3, 2004, entitled "Air Conditioner Device With Removable Driver Electrodes" (now abandoned).

FIELD OF THE INVENTION

The present invention is related generally to a device for conditioning air.

BACKGROUND OF THE INVENTION

The use of an electric motor to rotate a fan blade to create an airflow has long been known in the art. Although such fans can produce substantial airflow (e.g., 1,000 ft$^3$/minute or more), substantial electrical power is required to operate the motor, and essentially no conditioning of the flowing air occurs.

It is known to provide such fans with a HEPA-compliant filter element to remove particulate matter larger than perhaps 0.3 µm. Unfortunately, the resistance to airflow presented by the filter element may require doubling the electric motor size to maintain a desired level of airflow. Further, HEPA-compliant filter elements are expensive, and can represent a substantial portion of the sale price of a HEPA-compliant filter-fan unit. While such filter-fan units can condition the air by removing large particles, particulate matter small enough to pass through the filter element is not removed, including bacteria, for example.

It is also known in the art to produce an airflow using electro-kinetic techniques, whereby electrical power is converted into a flow of air without utilizing mechanically moving components. One such system is described in U.S. Pat. No. 4,789,801 to Lee (1988), depicted herein in simplified form as FIG. 1A, which is hereby incorporated by reference. System 10 includes an array of first ("emitter") electrodes or conductive surfaces 20 that are preferably spaced-apart symmetrically from an array of second ("collector") electrodes or conductive surfaces 30. The positive terminal of a generator such as, for example, pulse generator 40 which outputs a train of high voltage pulses (e.g., 0 to perhaps +5 KV) is coupled to the first array 20, and the negative pulse generator terminal is coupled to the second array 30 in this example.

In another particular embodiment shown herein as FIG. 1B, second electrodes 30 are preferably symmetrical and elongated in cross-section. The elongated trailing edges on the second electrodes 30 are symmetrically and elongated in cross-section. The elongated trailing edges on the second electrodes 30 provide increased area upon which particulate matter 60 entrained in the airflow can attach. While the electrostatic techniques disclosed by the '801 patent are advantageous over conventional electric fan-filter units, further increased air conditioning efficiency would be advantageous. One method of increasing air conditioning efficiency is to position driver electrodes between the collector electrodes whereby the driver electrodes aid in driving the particulates toward the collector electrodes.

BRIEF DESCRIPTION OF THE FIGURES

FIG. 2A illustrates a perspective view of the device in accordance with one embodiment of the present invention.

FIG. 2B illustrates a perspective view of the device in FIG. 2A with the removable collector electrode in accordance with one embodiment of the present invention.

FIG. 10A illustrates a perspective view of an electrode assembly in accordance with one embodiment of the present invention.

DETAILED DESCRIPTION OF THE PRESENT INVENTION

Figure 1A:
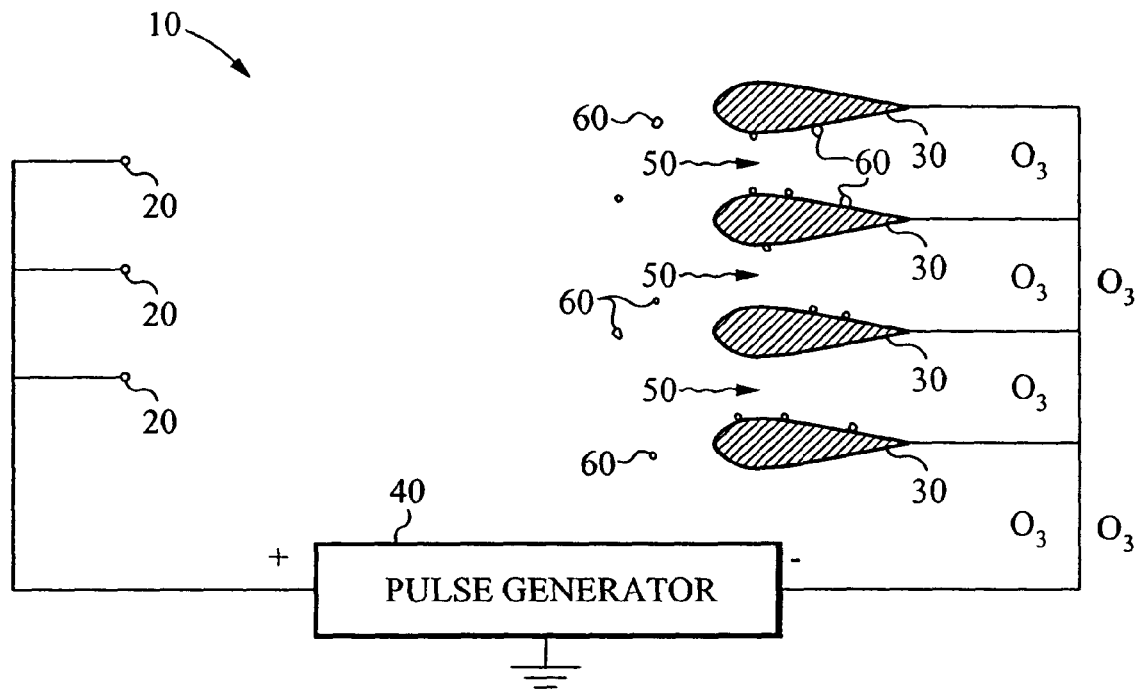
FIG. 1A illustrates a plan, cross sectional view, of the electro-kinetic air conditioner system according to the prior art.
Figure 1B:
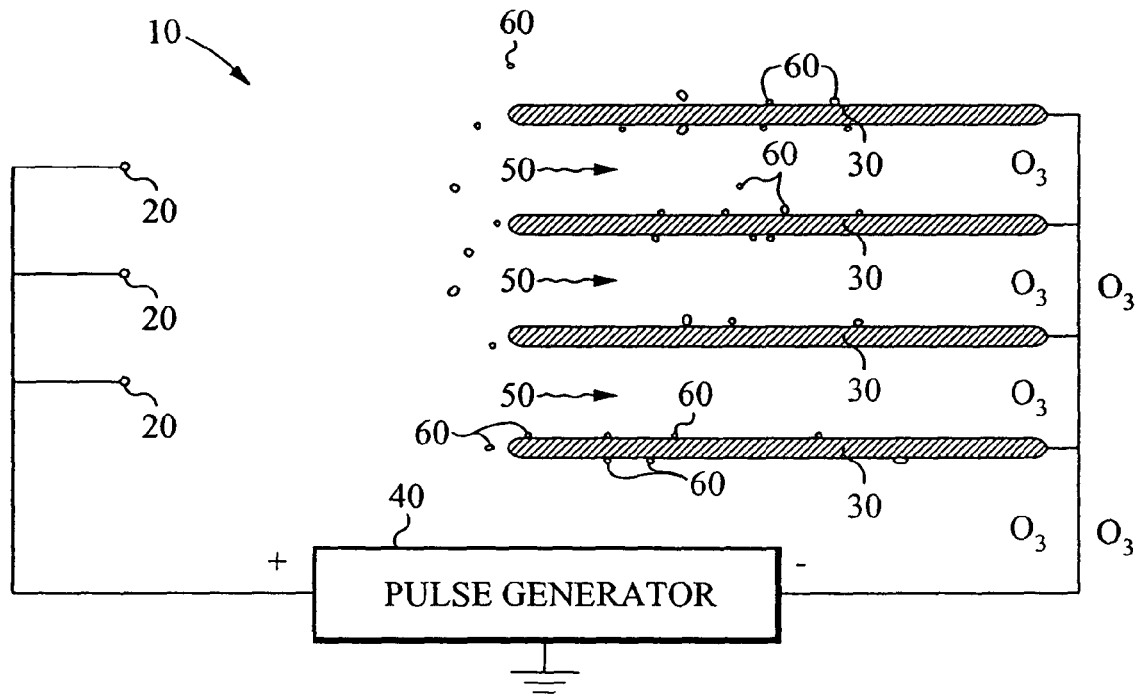
FIG. 1B illustrates a plan cross sectional view of the electro-kinetic air conditioner system according to the prior art.

Embodiments of the present invention are directed to method and apparatus for moving air preferably using an air conditioning system therein, with or without a fan, whereby the system preferably includes at least one emitter electrode, at least one collector electrode, at least one driver electrode disposed adjacent to the collector electrode, and at least one trailing electrode positioned downstream of the collector electrode. The collector electrode and the driver electrode are removable from the device. In one embodiment, the driver electrodes are removable from the device and/or the collector electrode. The ability to remove the collector electrode as well as the driver electrode allows for easy cleaning of the electrodes. In one embodiment, the present device includes a removable exhaust grill upon which the driver electrode and trailing electrode are coupled to. The removable grill allows the user to easily clean the driver electrode without having to remove the collector electrode.

One aspect of the present invention is directed to an air-conditioning device which comprises a housing that has an inlet and an outlet. The present invention includes an ion generator that is located in the housing and is configured to at least create ions in a flow of air. Also, the invention includes a driver electrode that is located proximal to the outlet, wherein the driver electrode is removable from the housing.

Another aspect of the present invention is directed to an air-conditioning device which comprises a housing with a removable grill. The present invention includes an ion generator which is located in the housing; and a driver electrode that is located adjacent to a collector electrode of the ion generator, wherein the driver electrode is coupled to the removable grill.

Another aspect of the present invention is directed to an air-conditioning device which comprises a housing which has an upper portion with a removable grill. The present invention includes an emitter electrode located in the housing as well as a collector electrode located in the housing, wherein the collector electrode is removable through the upper portion of the housing. The present invention includes a high voltage source that is operatively connected to at least one of the emitter electrode and the collector electrode. The present invention includes a driver electrode that is preferably coupled to the removable grill, wherein the driver electrode is removable from the housing.

Another aspect of the present invention is directed to an air-conditioning device which comprises a housing, an emitter electrode that is located in the housing, and a collector electrode located in the housing, wherein the collector electrode is removable from the housing. The present invention includes a high voltage source that is adapted to provide a voltage differential between the emitter electrode and the collector electrode. The present invention includes a driver electrode that is preferably removable from the housing with the collector electrode, wherein the driver electrode is removable from the collector electrode when the collector electrode is removed from the housing.

In yet another aspect of the present invention, an air-conditioning device which comprises a housing having an inlet grill and an outlet grill. The present invention includes at least one emitter electrode positioned within the housing proximal to the inlet grill. The present invention includes at least two collector electrodes, each having a leading portion and a trailing portion, wherein the collector electrodes are positioned proximal to the outlet grill. The present invention includes a high voltage source that is adapted to provide a voltage differential between the at least one emitter electrode and the collector electrodes. The present invention includes at least one removable driver electrode that is positioned between the at least two second electrodes proximal to the trailing portions.

Another aspect of the present invention is directed to a method of providing an air-conditioning device which comprises providing a housing; positioning an emitter electrode in the housing; and positioning a collector electrode downstream of the emitter electrode. The present method includes coupling a high voltage source that is adapted to provide a voltage differential between the emitter electrode and the collector electrode and positioning a removable driver electrode adjacent to the collector electrode in the housing.

Another aspect of the present invention includes a method of removing an electrode assembly for cleaning. The electrode assembly is positioned within an elongated housing of an air-conditioning device, wherein the housing has an upper portion and a grill that is configured to be selectively removable from a side of the housing. The electrode assembly includes an emitter electrode which is spaced from the collector electrodes. The electrode assembly includes a driver electrode positioned between the collector electrodes, wherein the emitter electrode and the collector electrodes are electrically coupled to a high voltage source. The method comprises lifting the electrode assembly from the housing through the upper portion, wherein the collector electrodes are at least partially exposed. The method further comprises removing the driver electrode from the lifted electrodes assembly. The method further alternatively comprises removing the grill from the side of the housing, wherein the driver electrode is at least partially exposed and is capable of being removably secured to an interior surface of the grill.

Another aspect of the present invention is directed to a method of removing an electrode assembly which includes collector and driver electrodes for cleaning. The electrode assembly is positioned within a housing of an air-conditioning device, wherein the housing has an upper portion. The method comprising the step of lifting the electrode assembly from the housing through the upper portion, wherein the collector electrodes and the driver electrodes are accessible.

Another aspect of the present invention is directed to a method of removing an electrode assembly which includes collector and driver electrodes for cleaning. The electrode assembly is positioned within a housing of an air-conditioning device, wherein the housing has an upper portion. The method comprises the step of lifting the electrode assembly from the housing through the upper portion. The method also includes the step of removing the driver electrode from the lifted electrode assembly.

Another aspect of the present invention is directed to a method of cleaning a driver electrode that is positioned within an elongated housing of an air-conditioning device which has a grill that is removable from a side of the housing. The method comprises removing the grill from the side of the housing, wherein the driver electrode is at least partially exposed.

Figure 6:
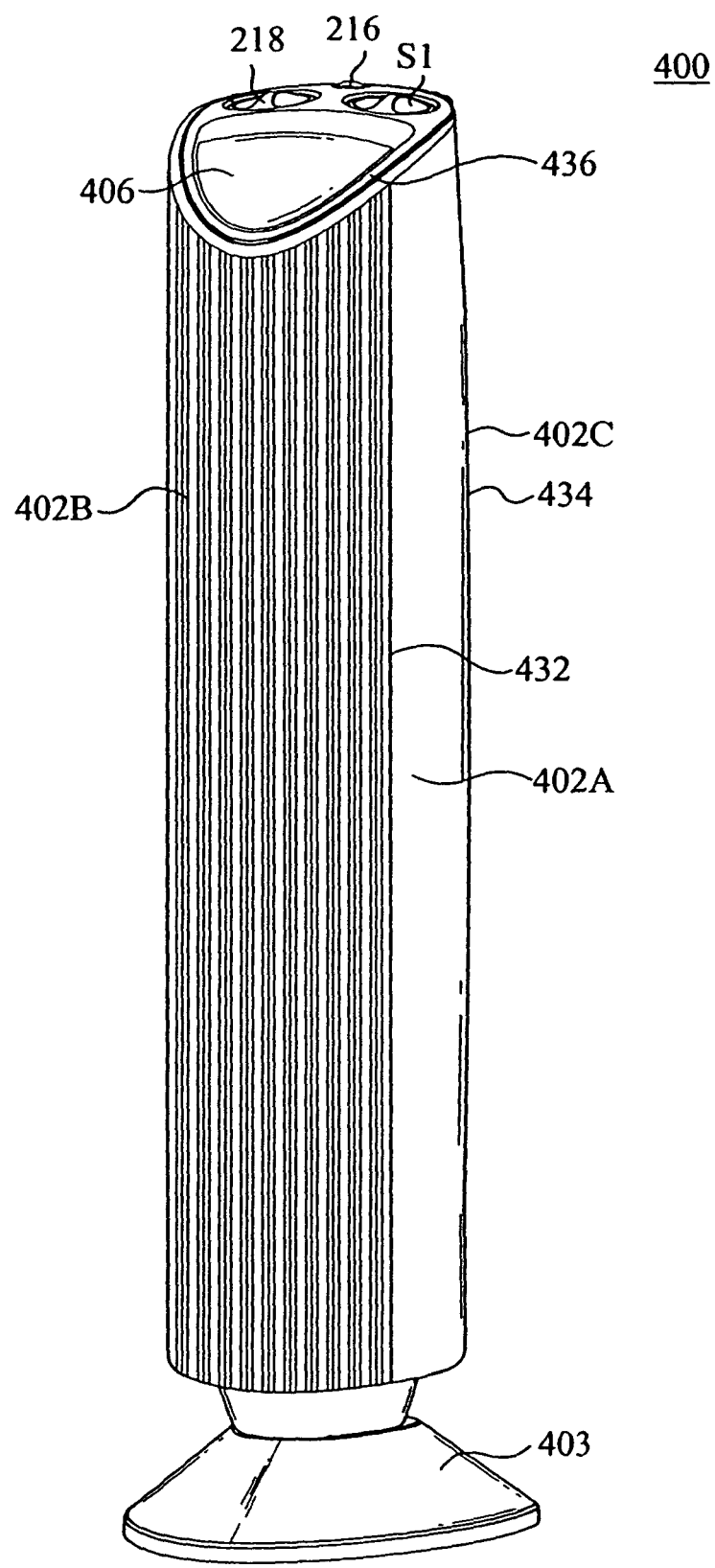
FIG. 6 illustrates a perspective view of the air conditioner system according to one embodiment of the present invention.

FIGS. 2A and 2B illustrate one embodiment of the air conditioner system 100 whose housing 102 includes rear-located intake vents with vent grills or louvers 104, front-located exhaust vents with vent grills or louvers 106, and a base pedestal 108. The system 100 includes at least one emitter electrode 232 and at least one collector electrode 242, which is preferably removable as discussed below. The front and rear grills 104, 106 preferably include several fins, whereby each fin is a thin ridge spaced-apart from the next fin so that each fin creates minimal resistance as air flows through the housing 102. In one embodiment, the fins are arranged vertically and are directed along the elongated vertical upstanding housing 102 of the unit 100 (FIG. 6). Alternatively, as shown in FIGS. 2A and 2B the fins are perpendicular to the electrodes 232, 242 and are configured horizontally. The inlet and outlet fins are aligned to give the unit a "see through" appearance. Thus, a user can "see through" the unit 100 from the inlet to the outlet or vice versa. The user will see no moving parts within the housing, but just a quiet unit that cleans the air passing therethrough. Other orientations of fins and electrodes are contemplated in other embodiments, such as a configuration in which the user is unable to see through the unit 100, whereby the unit 100 contains a germicidal lamp 290 (FIG. 3A) therein.

The unit 100 is energized by activating switch S1 on the top surface of the housing 102, whereby high voltage or high potential output by the voltage generator 170 produces ions at the emitter electrode 232 which are attracted to the collector electrodes 242. The ions move from an "IN" to an "OUT" direction from the emitter electrodes 232 to the collector electrodes 242 and are carried along with air molecules. In one embodiment, the device 100 electro-kinetically produces an outflow of ionized air. In another embodiment, the device 100 is an electro-static precipitator, whereby the device 100 produces ions in an airflow created by a fan or other device. The "IN" notation in FIG. 2A denotes the intake of ambient air with particulate matter 60 through the inlet vents. The "OUT" notation in FIG. 2A denotes the outflow of cleaned air through the outlet vent substantially devoid of the particulate matter 60. In the process of generating the ionized airflow, appropriate amounts of ozone ($O_3$) are beneficially produced. It is alternatively desired to provide the inner surface of the housing 102 with a shield to reduce detectable electromagnetic radiation. For example, a metal shield (not shown) is disposed within the housing 102, or portions of the interior of the housing 102 are alternatively coated with a metallic paint to reduce such radiation.

Figure 3A:
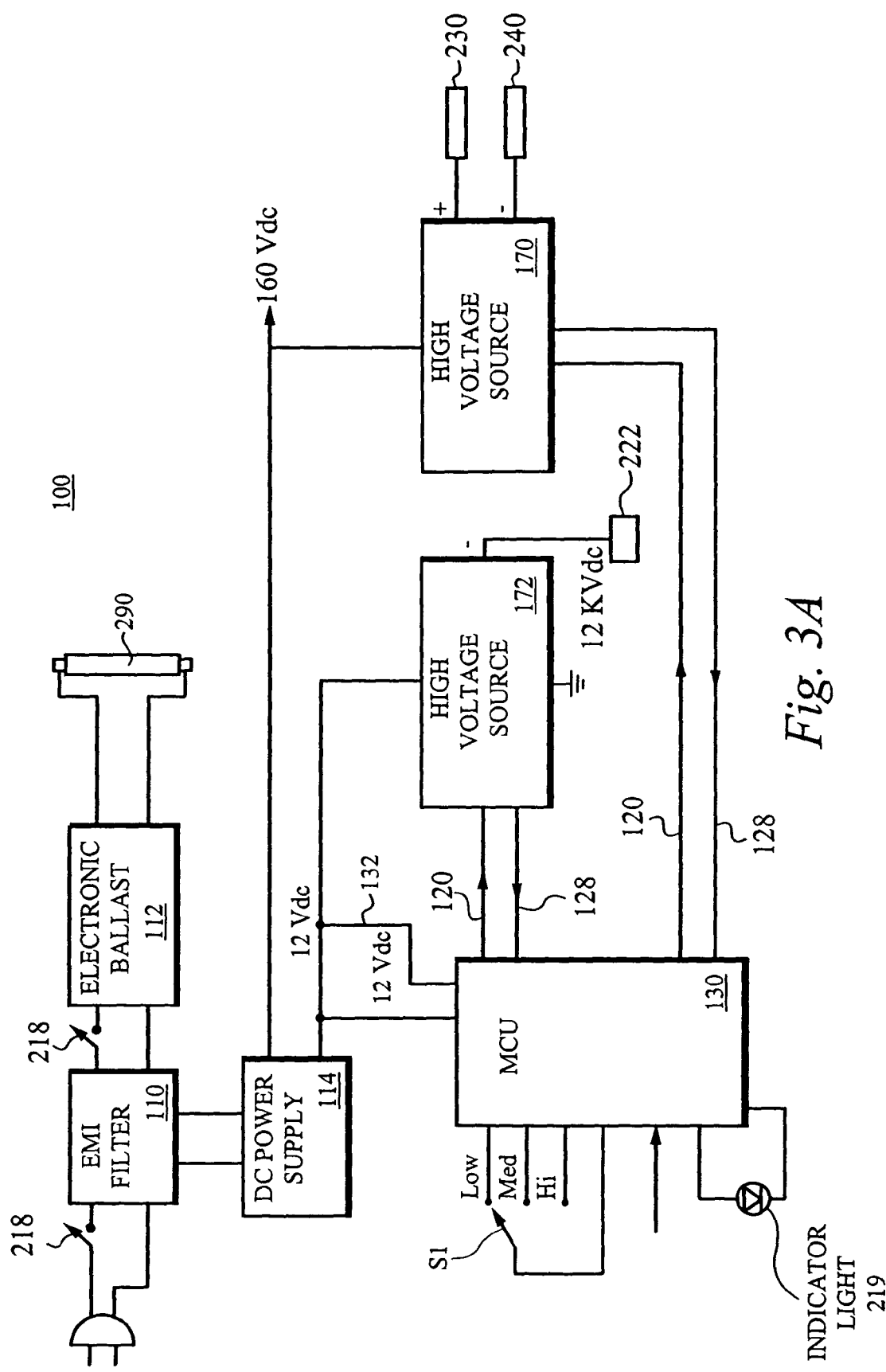
FIG. 3A illustrates an electrical block diagram of the high voltage power source of one embodiment of the present invention.

FIG. 3A illustrates an electrical circuit diagram for the system 100, according to one embodiment of the present invention. The system 100 has an electrical power cord that plugs into a common electrical wall socket that provides a nominal 110VAC. An electromagnetic interference (EMI) filter 110 is placed across the incoming nominal 110VAC line to reduce and/or eliminate high frequencies generated by the various circuits within the system 100, such as the electronic ballast 112. In one embodiment, the electronic ballast 112 is electrically connected to a germicidal lamp 290 (e.g. an ultra-violet lamp) to regulate, or control, the flow of current through the lamp 290. A switch 218 is used to turn the lamp 290 on or off. The EMI Filter 110 is well known in the art and does not require a further description. In another embodiment, the system 100 does not include the germicidal lamp 290, whereby the circuit diagram shown in FIG. 3A would not include the electronic ballast 112, the germicidal lamp 290, nor the switch 218 used to operate the germicidal lamp 290.

The EMI filter 110 is coupled to a DC power supply 114. The DC power supply 114 is coupled to the first HVS 170 as well as the second high voltage power source 172. The high voltage power source can also be referred to as a pulse generator. The DC power supply 114 is also coupled to the micro-controller unit (MCU) 130. The MCU 130 can be, for example, a Motorola 68HC908 series micro-controller, available from Motorola. Alternatively, any other type of MCU is contemplated. The MCU 130 can receive a signal from the switch S1 as well as a boost signal from the boost button 216. The MCU 130 also includes an indicator light 219 which specifies when the electrode assembly is ready to be cleaned.

The DC Power Supply 114 is designed to receive the incoming nominal 110VAC and to output a first DC voltage (e.g., 160VDC) to the first HVS 170. The DC Power Supply 114 voltage (e.g., 160VDC) is also stepped down to a second DC voltage (e.g., 12VDC) for powering the micro-controller unit (MCU) 130, the HVS 172, and other internal logic of the system 100. The voltage is stepped down through a resistor network, transformer or other component.

As shown in FIG. 3A, the first HVS 170 is coupled to the first electrode set 230 and the second electrode set 240 to provide a potential difference between the electrode sets. In one embodiment, the first HVS 170 is electrically coupled to the driver electrode 246, as described above. In addition, the first HVS 170 is coupled to the MCU 130, whereby the MCU receives arc sensing signals 128 from the first HVS 170 and provides low voltage pulses 120 to the first HVS 170. Also shown in FIG. 3A is the second HVS 172 which provides a voltage to the trailing electrodes 222. In addition, the second HVS 172 is coupled to the MCU 130, whereby the MCU receives arc sensing signals 128 from the second HVS 172 and provides low voltage pulses 120 to the second HVS 172.

In accordance with one embodiment of the present invention, the MCU 130 monitors the stepped down voltage (e.g., about 12VDC), which is referred to as the AC voltage sense signal 132 in FIG. 3A, to determine if the AC line voltage is above or below the nominal 110VAC, and to sense changes in the AC line voltage. For example, if a nominal 110VAC increases by 10% to 121 VAC, then the stepped down DC voltage will also increase by 10%. The MCU 130 can sense this increase and then reduce the pulse width, duty cycle and/or frequency of the low voltage pulses to maintain the output power (provided to the HVS 170) to be the same as when the line voltage is at 110VAC. Conversely, when the line voltage drops, the MCU 130 can sense this decrease and appropriately increase the pulse width, duty cycle and/or frequency of the low voltage pulses to maintain a constant output power. Such voltage adjustment features of the present invention also enable the same system 100 to be used in different countries that have different nominal voltages than in the United States (e.g., in Japan the nominal AC voltage is 100VAC).

Figure 3B:
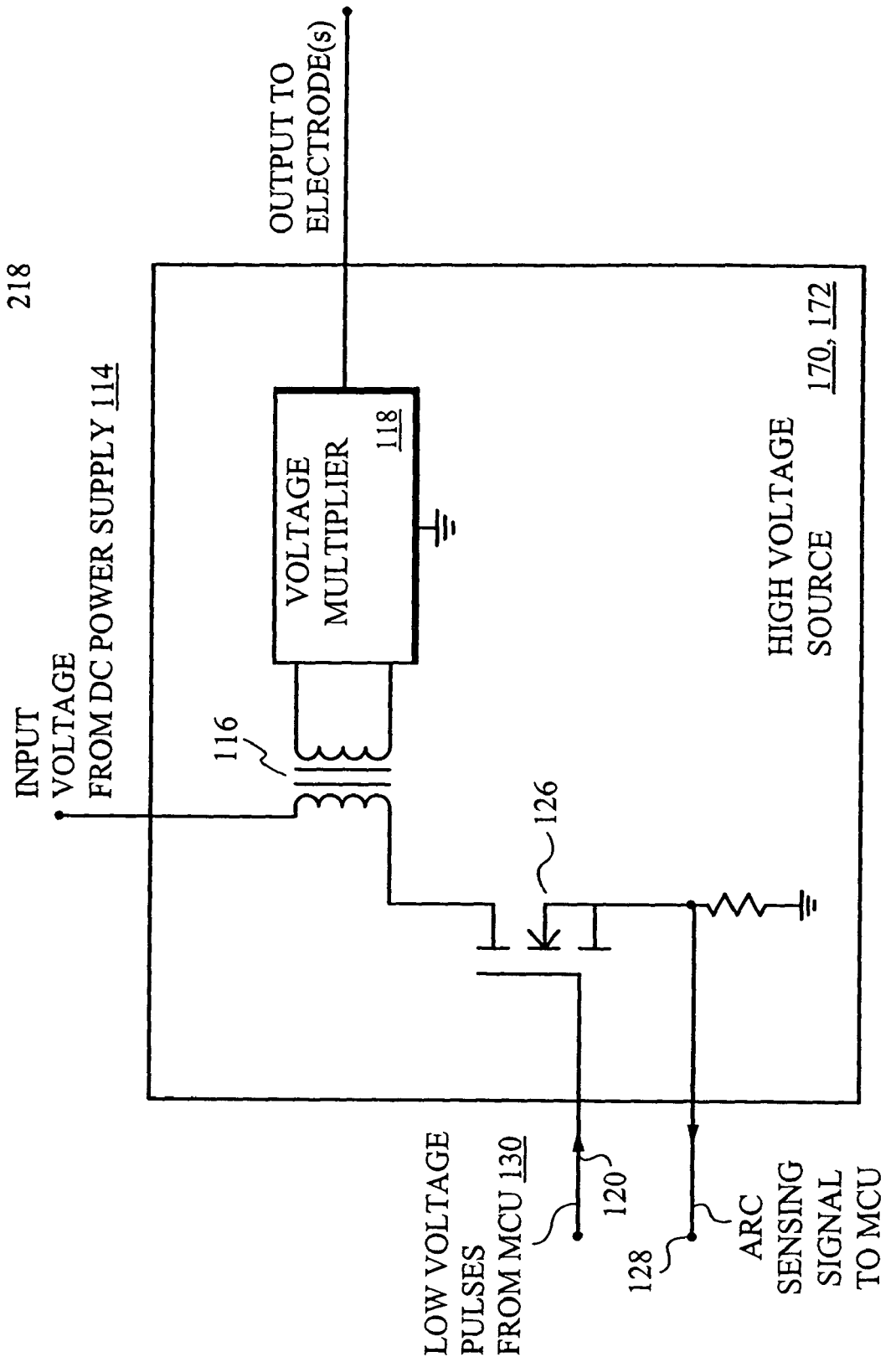
FIG. 3B illustrates an electrical block diagram of the high voltage power source in accordance with one embodiment of the present invention.

FIG. 3B illustrates a schematic block diagram of the high voltage power supply in accordance with one embodiment of the present invention. For the present description, the first and second HVSs 170, 172 include the same or similar components as that shown in FIG. 3B. However, it is apparent to one skilled in the art that the first and second HVSs 170, 172 are alternatively comprised of different components from each other as well as those shown in FIG. 3B.

In the embodiment shown in FIG. 3B, the HVSs 170, 172 include an electronic switch 126, a step-up transformer 116 and a voltage multiplier 118. The primary side of the step-up transformer 116 receives the DC voltage from the DC power supply 114. For the first HVS 170, the DC voltage received from the DC power supply 114 is approximately 160Vdc. For the second HVS 172, the DC voltage received from the DC power supply 114 is approximately 12 Vdc. An electronic switch 126 receives low voltage pulses 120 (of perhaps 20-25 KHz frequency) from the MCU 130. Such a switch is shown as an insulated gate bipolar transistor (IGBT) 126. The IGBT 126, or other appropriate switch, couples the low voltage pulses 120 from the MCU 130 to the input winding of the step-up transformer 116. The secondary winding of the transformer 116 is coupled to the voltage multiplier 118, which outputs the high voltage pulses to the electrode(s). For the first HVS 170, the electrode(s) are the emitter and collector electrode sets 230 and 240. For the second HVS 172, the electrode(s) are the trailing electrodes 222. In general, the IGBT 126 operates as an electronic on/off switch. Such a transistor is well known in the art and does not require a further description.

When driven, the first and second HVSs 170, 172 receive the low input DC voltage from the DC power supply 114 and the low voltage pulses from the MCU 130 and generate high voltage pulses of preferably at least 5 KV peak-to-peak with a repetition rate of about 20 to 25 KHz. The voltage multiplier 118 in the first HVS 170 outputs between 5 to 9 KV to the first set of electrodes 230 and between −6 to −18 KV to the second set of electrodes 240. In the preferred embodiment, the emitter electrodes 232 receive approximately 5 to 6 KV whereas the collector electrodes 242 receive approximately −9 to −10 KV. The voltage multiplier 118 in the second HVS 172 outputs approximately −12 KV to the trailing electrodes 222. In one embodiment, the driver electrodes 246 are preferably connected to ground. It is within the scope of the present invention for the voltage multiplier 118 to produce greater or smaller voltages. The high voltage pulses preferably have a duty cycle of about 10%-15%, but may have other duty cycles, including a 100% duty cycle.

The MCU 130 is coupled to a control dial S1, as discussed above, which can be set to a LOW, MEDIUM or HIGH airflow setting as shown in FIG. 3A. The MCU 130 controls the amplitude, pulse width, duty cycle and/or frequency of the low voltage pulse signal to control the airflow output of the system 100, based on the setting of the control dial S1. To increase the airflow output, the MCU 130 can be set to increase the amplitude, pulse width, frequency and/or duty cycle. Conversely, to decrease the airflow output rate, the MCU 130 is able to reduce the amplitude, pulse width, frequency and/or duty cycle. In accordance with one embodiment, the low voltage pulse signal 120 has a fixed pulse width, frequency and duty cycle for the LOW setting, another fixed pulse width, frequency and duty cycle for the MEDIUM setting, and a further fixed pulse width, frequency and duty cycle for the HIGH setting.

In accordance with one embodiment of the present invention, the low voltage pulse signal 120 modulates between a predetermined duration of a "high" airflow signal and a "low" airflow signal. It is preferred that the low voltage signal modulates between a predetermined amount of time when the airflow is to be at the greater "high" flow rate, followed by another predetermined amount of time in which the airflow is to be at the lesser "low" flow rate. This is preferably executed by adjusting the voltages provided by the first HVS to the first and second sets of electrodes for the greater flow rate period and the lesser flow rate period. This produces an acceptable airflow output while limiting the ozone production to acceptable levels, regardless of whether the control dial S1 is set to HIGH, MEDIUM or LOW. For example, the "high" airflow signal can have a pulse width of 5 microseconds and a period of 40 microseconds (i.e., a 12.5% duty cycle), and the "low" airflow signal can have a pulse width of 4 microseconds and a period of 40 microseconds (i.e., a 10% duty cycle).

In general, the voltage difference between the first set 230 and the second set 240 is proportional to the actual airflow output rate of the system 100. Thus, the greater voltage differential is created between the first and second set electrodes 230, 240 by the "high" airflow signal, whereas the lesser voltage differential is created between the first and second set electrodes 230, 240 by the "low" airflow signal. In one embodiment, the airflow signal causes the voltage multiplier 118 to provide between 5 and 9 KV to the first set electrodes 230 and between −9 and −10 KV to the second set electrodes 240. For example, the "high" airflow signal causes the voltage multiplier 118 to provide 5.9 KV to the first set electrodes 230 and −9.8 KV to the second set electrodes 240. In the example, the "low" airflow signal causes the voltage multiplier 118 to provide 5.3 KV to the first set electrodes 230 and −9.5 KV to the second set electrodes 240. It is within the scope of the present invention for the MCU 130 and the first HVS 170 to produce voltage potential differentials between the first and second sets electrodes 230 and 240 other than the values provided above and is in no way limited by the values specified.

In accordance with the preferred embodiment of the present invention, when the control dial S1 is set to HIGH, the electrical signal output from the MCU 130 will continuously drive the first HVS 170 and the airflow, whereby the electrical signal output modulates between the "high" and "low" airflow signals stated above (e.g. 2 seconds "high" and 10 seconds "low"). When the control dial S1 is set to MEDIUM, the electrical signal output from the MCU 130 will cyclically drive the first HVS 170 (i.e. airflow is "On") for a predetermined amount of time (e.g., 20 seconds), and then drop to a zero or a lower voltage for a further predetermined amount of time (e.g., a further 20 seconds). It is to be noted that the cyclical drive when the airflow is "On" is preferably modulated between the "high" and "low" airflow signals (e.g. 2 seconds "high" and 10 seconds "low"), as stated above. When the control dial S1 is set to LOW, the signal from the MCU 130 will cyclically drive the first HVS 170 (i.e. airflow is "On") for a predetermined amount of time (e.g., 20 seconds), and then drop to a zero or a lower voltage for a longer time period (e.g., 80 seconds). Again, it is to be noted that the cyclical drive when the airflow is "On" is preferably modulated between the "high" and "low" airflow signals (e.g. 2 seconds "high" and 10 seconds "low"), as stated above. It is within the scope and spirit of the present invention the HIGH, MEDIUM, and LOW settings will drive the first HVS 170 for longer or shorter periods of time. It is also contemplated that the cyclic drive between "high" and "low" airflow signals are durations and voltages other than that described herein.

Cyclically driving airflow through the system 100 for a period of time, followed by little or no airflow for another period of time (i.e. MEDIUM and LOW settings) allows the overall airflow rate through the system 100 to be slower than when the dial S1 is set to HIGH. In addition, cyclical driving reduces the amount of ozone emitted by the system since little or no ions are produced during the period in which lesser or no airflow is being output by the system. Further, the duration in which little or no airflow is driven through the system 100 provides the air already inside the system a longer dwell time, thereby increasing particle collection efficiency. In one embodiment, the long dwell time allows air to be exposed to a germicidal lamp, if present.

Regarding the second HVS 172, approximately 12 volts DC is applied to the second HVS 172 from the DC Power Supply 114. The second HVS 172 provides a negative charge (e.g. −12 KV) to one or more trailing electrodes 222 in one embodiment. However, it is contemplated that the second HVS 172 provides a voltage in the range of, and including, −10 KV to −60 KV in other embodiments. In one embodiment, other voltages produced by the second HVS 172 are contemplated.

In one embodiment, the second HVS 172 is controllable independently from the first HVS 170 (as for example by the boost button 216) to allow the user to variably increase or decrease the amount of negative ions output by the trailing electrodes 222 without correspondingly increasing or decreasing the amount of voltage provided to the first and second set of electrodes 230, 240. The second HVS 172 thus provides freedom to operate the trailing electrodes 222 independently of the remainder of the electrode assembly 220 to reduce static electricity, eliminate odors and the like. In addition, the second HVS 172 allows the trailing electrodes 222 to operate at a different duty cycle, amplitude, pulse width, and/or frequency than the electrode sets 230 and 240. In one embodiment, the user is able to vary the voltage supplied by the second HVS 172 to the trailing electrodes 222 at any time by depressing the button 216. In one embodiment, the user is able to turn on or turn off the second HVS 172, and thus the trailing electrodes 222, without affecting operation of the electrode assembly 220 and/or the germicidal lamp 290. It should be noted that the second HVS 172 can also be used to control electrical components other than the trailing electrodes 222 (e.g. driver electrodes and germicidal lamp).

As mentioned above, the system 100 includes a boost button 216. In one embodiment, the trailing electrodes 222 as well as the electrode sets 230, 240 are controlled by the boost signal from the boost button 216 input into the MCU 130. In one embodiment, as mentioned above, the boost button 216 cycles through a set of operating settings upon the boost button 216 being depressed. In the example embodiment discussed below, the system 100 includes three operating settings. However, any number of operating settings are contemplated within the scope of the invention.

The following discussion presents methods of operation of the boost button 216 which are variations of the methods discussed above. In particular, the system 100 will operate in a first boost setting when the boost button 216 is pressed once. In the first boost setting, the MCU 130 drives the first HVS 170 as if the control dial S1 was set to the HIGH setting for a predetermined amount of time (e.g., 6 minutes), even if the control dial S1 is set to LOW or MEDIUM (in effect overriding the setting specified by the dial S1). The predetermined time period may be longer or shorter than 6 minutes. For example, the predetermined period can also preferably be 20 minutes if a higher cleaning setting for a longer period of time is desired. This will cause the system 100 to run at a maximum airflow rate for the predetermined boost time period. In one embodiment, the low voltage signal modulates between the "high" airflow signal and the "low" airflow signal for predetermined amount of times and voltages, as stated above, when operating in the first boost setting. In another embodiment, the low voltage signal does not modulate between the "high" and "low" airflow signals.

In the first boost setting, the MCU 130 will also operate the second HVS 172 to operate the trailing electrode 222 to generate ions, preferably negative, into the airflow. In one embodiment, the trailing electrode 222 will preferably repeatedly emit ions for one second and then terminate for five seconds for the entire predetermined boost time period. The increased amounts of ozone from the boost level will further reduce odors in the entering airflow as well as increase the particle capture rate of the system 100. At the end of the predetermined boost period, the system 100 will return to the airflow rate previously selected by the control dial S1. It should be noted that the on/off cycle at which the trailing electrodes 222 operate are not limited to the cycles and periods described above.

In the example, once the boost button 216 is pressed again, the system 100 operates in the second setting, which is an increased ion generation or "feel good" mode. In the second setting, the MCU 130 drives the first HVS 170 as if the control dial S1 was set to the LOW setting, even if the control dial S1 is set to HIGH or MEDIUM (in effect overriding the setting specified by the dial S1). Thus, the airflow is not continuous, but "On" and then at a lesser or zero airflow for a predetermined amount of time (e.g. 6 minutes). In addition, the MCU 130 will operate the second HVS 172 to operate the trailing electrode 222 to generate negative ions into the airflow. In one embodiment, the trailing electrode 222 will repeatedly emit ions for one second and then terminate for five seconds for the predetermined amount of time. It should be noted that the on/off cycle at which the trailing electrodes 222 operate are not limited to the cycles and periods described above.

In the example, upon the boost button 216 being pressed again, the MCU 130 will operate the system 100 in a third operating setting, which is a normal operating mode. In the third setting, the MCU 130 drives the first HVS 170 depending on the which setting the control dial S1 is set to (e.g. HIGH, MEDIUM or LOW). In addition, the MCU 130 will operate the second HVS 172 to operate the trailing electrode 222 to generate ions, preferably negative, into the airflow at a predetermined interval. In one embodiment, the trailing electrode 222 will repeatedly emit ions for one second and then terminate for nine seconds. In another embodiment, the trailing electrode 222 does not operate at all in this mode. The system 100 will continue to operate in the third setting by default until the boost button 216 is pressed. It should be noted that the on/off cycle at which the trailing electrodes 222 operate are not limited to the cycles and periods described above.

In one embodiment, the present system 100 operates in an automatic boost mode upon the system 100 being initially plugged into the wall and/or initially being turned on after being off for a predetermined amount of time. In particular, upon the system 100 being turned on, the MCU 130 automatically drives the first HVS 170 as if the control dial S1 was set to the HIGH setting for a predetermined amount of time, as discussed above, even if the control dial S1 is set to LOW or MEDIUM, thereby causing the system 100 to run at a maximum airflow rate for the amount of time. In addition, the MCU 130 automatically operates the second HVS 172 to operate the trailing electrode 222 at a maximum ion emitting rate to generate ions, preferably negative, into the airflow for the same amount of time. This configuration allows the system 100 to effectively clean stale, pungent, and/or polluted air in a room which the system 100 has not been continuously operating in. This feature improves the air quality at a faster rate while emitting negative "feel good" ions to quickly eliminate any odor in the room. Once the system 100 has been operating in the first setting boost mode, the system 100 automatically adjusts the airflow rate and ion emitting rate to the third setting (i.e. normal operating mode). For example, in this initial plug-in or initial turn-on mode, the system can operate in the high setting for 20 minutes to enhance the removal of particulates and to more rapidly clean the air as well as deodorize the room.

In addition, the system 100 will include an indicator light which informs the user what mode the system 100 is operating in when the boost button 216 is depressed. In one embodiment, the indicator light is the same as the cleaning indicator light 219 discussed above. In another embodiment, the indicator light is a separate light from the indicator light 219. For example only, the indicator light will emit a blue light when the system 100 operates in the first setting. In addition, the indicator light will emit a green light when the system 100 operates in the second setting. In the example, the indicator light will not emit a light when the system 100 is operating in the third setting.

The MCU 130 provides various timing and maintenance features in one embodiment. For example, the MCU 130 can provide a cleaning reminder feature (e.g., a 2 week timing feature) that provides a reminder to clean the system 100 (e.g., by causing indicator light 219 to turn on amber, and/or by triggering an audible alarm that produces a buzzing or beeping noise). The MCU 130 can also provide arc sensing, suppression and indicator features, as well as the ability to shut down the first HVS 170 in the case of continued arcing. Details regarding arc sensing, suppression and indicator features are described in U.S. patent application Ser. No. 10/625, 401 which is incorporated by reference above.

Figure 4:
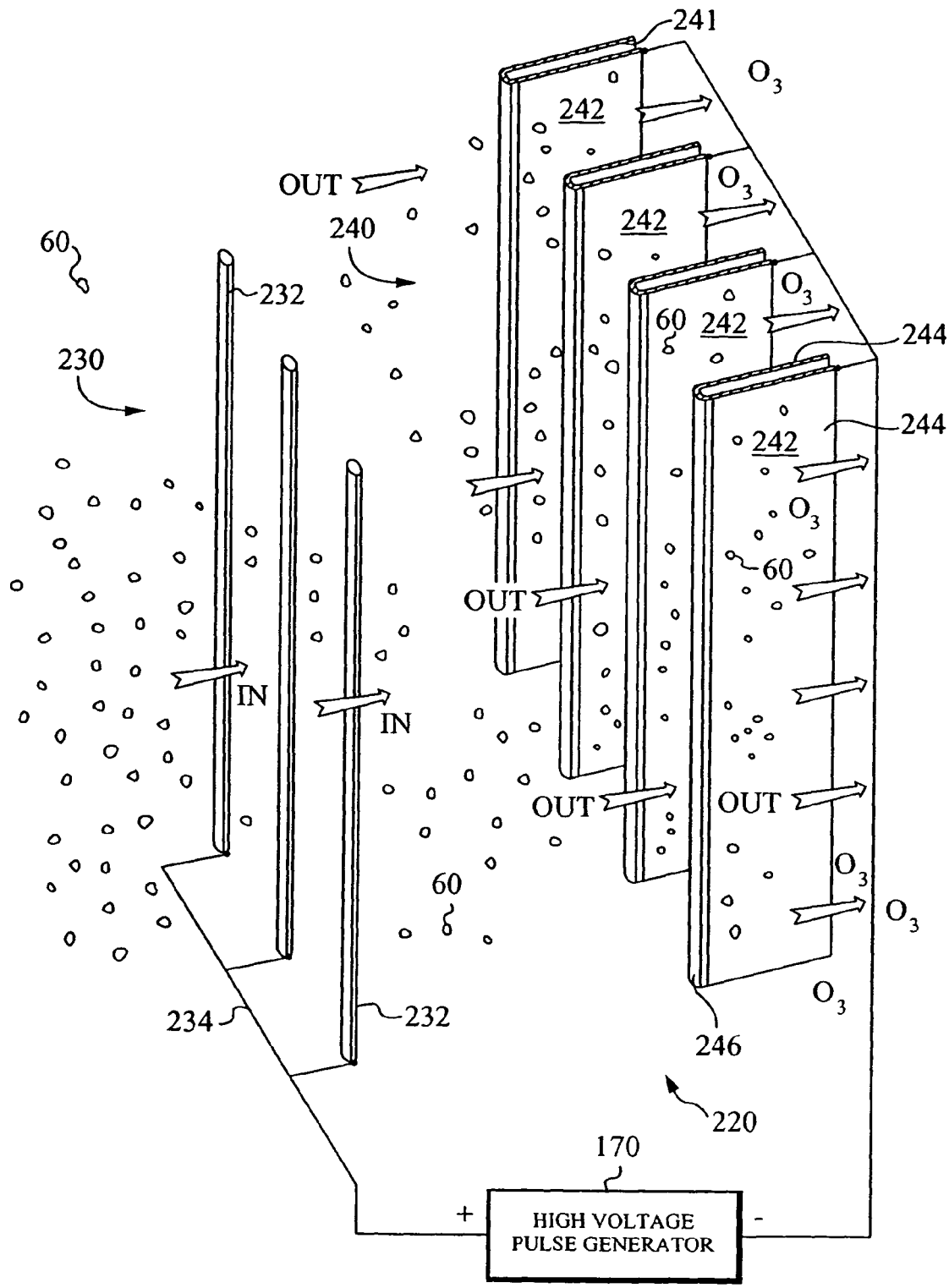
FIG. 4 illustrates a perspective view of the electrode assembly according to one embodiment of the present invention.

FIG. 4 illustrates a perspective view of one embodiment of the electrode assembly 220 in accordance with the present invention. As shown in FIG. 4, the electrode assembly 220 comprises a first set 230 of at least one emitter electrode 232, and further comprises a second set 240 of at least one collector electrode 242. It is preferred that the number N1 of emitter electrodes 232 in the first set 230 differ by one relative to the number N2 of collector electrodes 242 in the second set 240. Preferably, the system includes a greater number of collector electrodes 242 than emitter electrodes 232. However, if desired, additional emitter electrodes 232 are alternatively positioned at the outer ends of set 230 such that N1>N2, e.g., five emitter electrodes 232 compared to four collector electrodes 242. Alternatively, instead of multiple electrodes, single electrodes or single conductive surfaces are substituted.

The material(s) of the electrodes 232 and 242 should conduct electricity and be resistant to the corrosive effects from the application of high voltage, but yet be strong and durable enough to be cleaned periodically. In one embodiment, the emitter electrodes 232 are fabricated from tungsten. Tungsten is sufficiently robust in order to withstand cleaning, has a high melting point to retard breakdown due to ionization, and has a rough exterior surface that promotes efficient ionization. The collector electrodes 242 preferably have a highly polished exterior surface to minimize unwanted point-to-point radiation. As such, the collector electrodes 242 are fabricated from stainless steel and/or brass, among other appropriate materials. The polished surface of electrodes 232 also promotes ease of electrode cleaning. The materials and construction of the electrodes 232 and 242, allow the electrodes 232, 242 to be light weight, easy to fabricate, and lend themselves to mass production. Further, electrodes 232 and 242 described herein promote more efficient generation of ionized air, and appropriate amounts of ozone.

As shown in FIG. 4, the electrode assembly 220 is electrically connected to the high voltage source unit, such as a high voltage pulse generator 170. In one embodiment, the positive output terminal of the high voltage source 170 is coupled to the emitter electrodes 232, and the negative output terminal of high voltage source 170 is coupled to the collector electrodes 242 as shown in FIG. 4. This coupling polarity has been found to work well and minimizes unwanted audible electrode vibration or hum. However, while generation of positive ions is conducive to a relatively silent airflow, from a health standpoint it is desired that the output airflow be richer in negative ions than positive ions. It is noted that in some embodiments, one port (preferably the negative port) of the high voltage pulse generator 170 can in fact be the ambient air. Thus, the collector electrodes 242 need not be connected to the high voltage pulse generator 170 using a wire. Nonetheless, there will be an "effective connection" between the collector electrodes 242 and one output port of the high voltage pulse generator 170, in this instance, via ambient air. Alternatively the negative output terminal of unit 170 is connected to the emitter electrodes 232 and the positive output terminal is connected to the collector electrodes 242.

When voltage or pulses from the high voltage source 170 are generated across the emitter and collector electrodes 232, 242, a plasma-like field is created surrounding the emitter electrodes 232. This electric field ionizes the ambient air between the emitter and the collector electrodes 232, 242 and establishes an "OUT" airflow that moves towards the collector electrodes 242 Ozone and ions are generated simultaneously by the emitter electrodes 232 from the voltage potential provided by the high voltage source 170. Ozone generation can be increased or decreased by increasing or decreasing the voltage potential at the emitter electrodes 232. Coupling an opposite polarity potential to the collector electrodes 242 accelerates the motion of ions generated at the emitter electrodes 232, thereby producing ions. Molecules as well as particulates in the air thus become ionized with the charge emitted by the emitter electrodes 232 as they pass by the electrodes 232. As the ions and ionized particulates 60 move toward or along the collector electrodes 242, the opposite polarity of the collector electrodes 242 causes the ionized particles 60 to be attracted and thereby move toward the collector electrodes 242. Therefore, the collector electrodes 242 collect the ionized particulates 60 in the air, thereby allowing the device 100 to output cleaner, fresher air.

Figure 5:
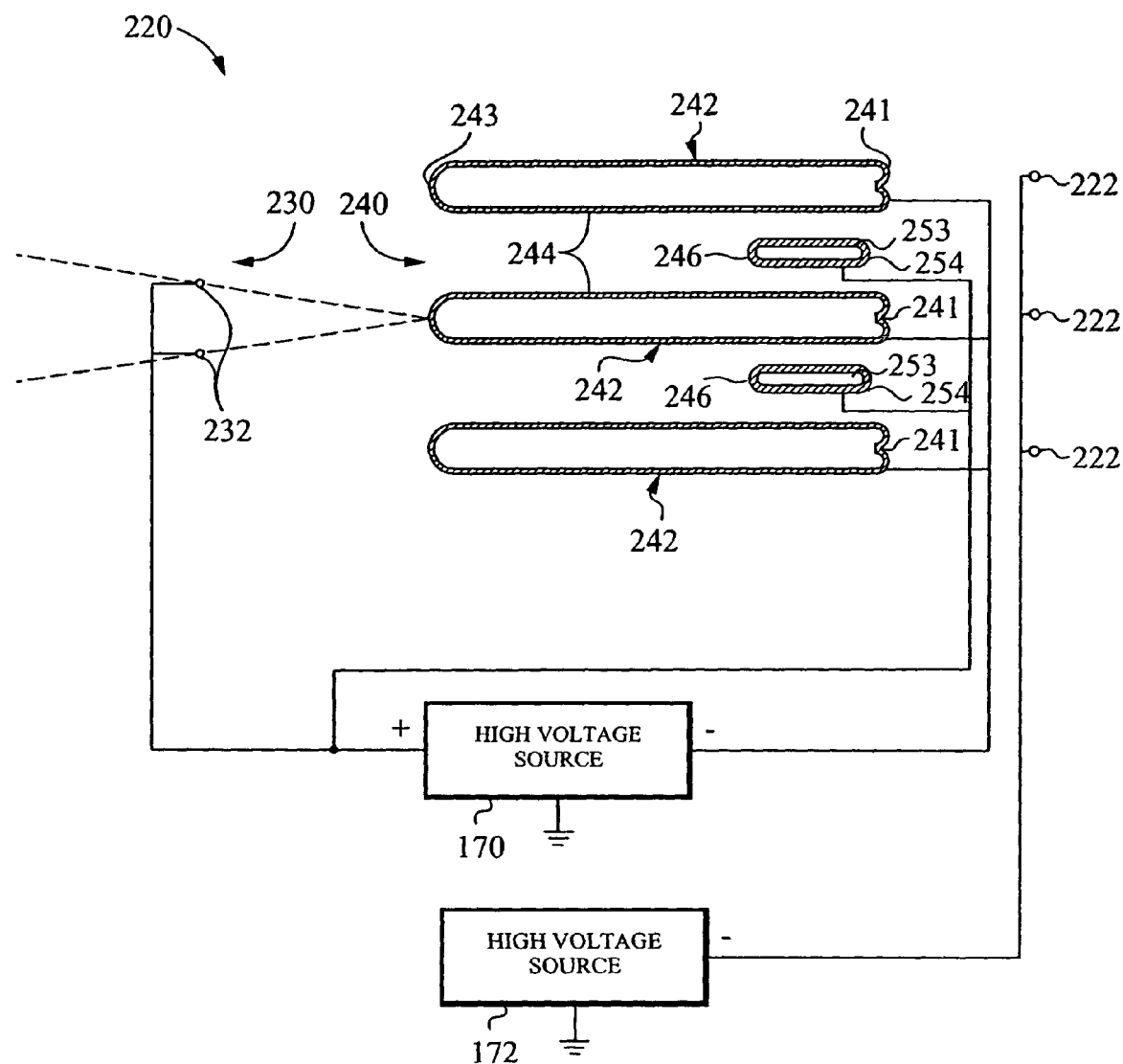
FIG. 5 illustrates a plan view of the electrode assembly according to one embodiment of the present invention.

FIG. 5 illustrates a plan view schematic of one embodiment of the electrode assembly 220. Each collector electrode 242 in the embodiment shown in FIG. 5 includes a nose 243, two parallel trailing sides 244 and an end 241 opposite the nose 243. In addition, the electrode assembly 220 includes a set of driver electrodes 246. The driver electrodes 246 include two sides which are parallel to each other, as well as a front end and a rear end. In another embodiment, the driver electrode is a wire or a series of wires configured in a line. Although two driver electrodes 246 are shown, it is apparent that any number of driver electrodes, including only one, is contemplated within the scope of the present invention.

In the embodiment shown in FIG. 5, the driver electrodes 246 are located midway, interstitially between the collector electrodes 242. It is preferred that the driver electrodes 246 are positioned proximal to the trailing end 241 of the collector electrodes 242, although not necessarily. In one embodiment, the driver electrodes 246 are electrically connected to the positive terminal of the high voltage source 170, as shown in FIG. 5. In another embodiment, the driver electrodes 246 are electrically connected to the emitter electrodes 232. Alternatively, the driver electrodes 246 have a floating potential or are alternatively grounded. Ionized particles traveling toward the driver electrodes 246 are preferably repelled by the driver electrodes 246 towards the collector electrodes 242, especially in the embodiment in which the driver electrodes 246 are positively charged.

As shown in FIG. 5, each insulated driver electrode 246 includes an underlying electrically conductive electrode 253 that is covered by a dielectric material 254. In accordance with one embodiment of the present invention, the electrically conductive electrode 253 is located on a printed circuit board (PCB) covered by one or more additional layers of insulated material 254. Exemplary insulated PCBs are generally commercially available and may be found from a variety of sources, including for example Electronic Service and Design Corp, of Harrisburg, Pa. Alternatively, the dielectric material 254 could be heat shrink tubing wherein during manufacture, heat shrink tubing is placed over the conductive electrodes 253 and then heated, which causes the tubing to shrink to the shape of the conductive electrodes 253. An exemplary heat shrinkable tubing is type FP-301 flexible polyolefin tubing available from 3M of St. Paul, Minn.

Alternatively, the dielectric material 254 may be an insulating varnish, lacquer or resin. For example, a varnish, after being applied to the surface of a conductive electrode, dries and forms an insulating coat or film, a few mils (thousands of an inch) in thickness, covering the electrodes 253. The dielectric strength of the varnish or lacquer can be, for example, above 1000 V/mil (Volts per thousands of an inch). Such insulating varnishes, lacquers and resins are commercially available from various sources, such as from John C. Dolph Company of Monmouth Junction, N.J., and Ranbar Electrical Materials Inc. of Manor, Pa.

Other possible dielectric materials that can be used to insulate the driver electrodes 246 include ceramic or porcelain enamel or fiberglass. These are just a few examples of dielectric materials 254 that can be used to insulate the driver electrodes 246. It is within the spirit and scope of the present invention that other insulating dielectric materials 254 can be used to insulate the driver electrodes 246.

As shown in FIG. 5, the electrode assembly 220 preferably includes a set of at least one trailing electrode 222 positioned downstream of the collector electrodes 242. In the embodiment shown in FIG. 5, three trailing electrodes 222 are positioned directly downstream and in-line with the collector electrodes 242. In another embodiment, the trailing electrodes 222 are positioned adjacent to the collector electrodes 242. In another embodiment, the trailing electrodes 222 are positioned adjacent to the driver electrodes 246. The trailing electrodes 222 are preferably electrically connected to the negative terminal of the high voltage source 170, whereby the trailing electrodes 222 promote additional negative ions into the air exiting the unit 100. The trailing electrodes 222 are configured to be wire shaped and extend substantially along the length of the electrode assembly 220. The wire shaped trailing electrodes 222 are advantageous, because negative ions are produced along the entire length of the electrode 222. This production of negative ions along the entire length of the electrode 222 allows more ions to be freely dissipated in the air as the air flows past the electrode assembly 220. Alternatively, or additionally, the trailing electrode 222 is a triangular shape with pointed ends, instead of a wire.

FIG. 6 illustrates a perspective view of the air conditioner device in accordance with one embodiment of the present invention. The device 400 of the present invention includes a housing 402A which is coupled to the base 403, whereby the housing 402A preferably stands upright from the base 403 and has a freestanding, elongated shape. The housing 402A also includes a top surface 436 which includes one or more switches 401 as well as a liftable handle 406. The switch 401 has already been discussed and it is contemplated that the switch 401 replaces or substitutes switches S1, S2, S3 shown in FIGS. 2A and 2B. The housing 402A has a cylindrical shape and generally has a front end 432 as well as and a back end 434. The outlet vent, also referred to as the exhaust grill 402B, is coupled to the front end 432 of the housing 402A, and an inlet or intake grill 402C is coupled to the back end 434 of the housing 402A.

Figure 7A:
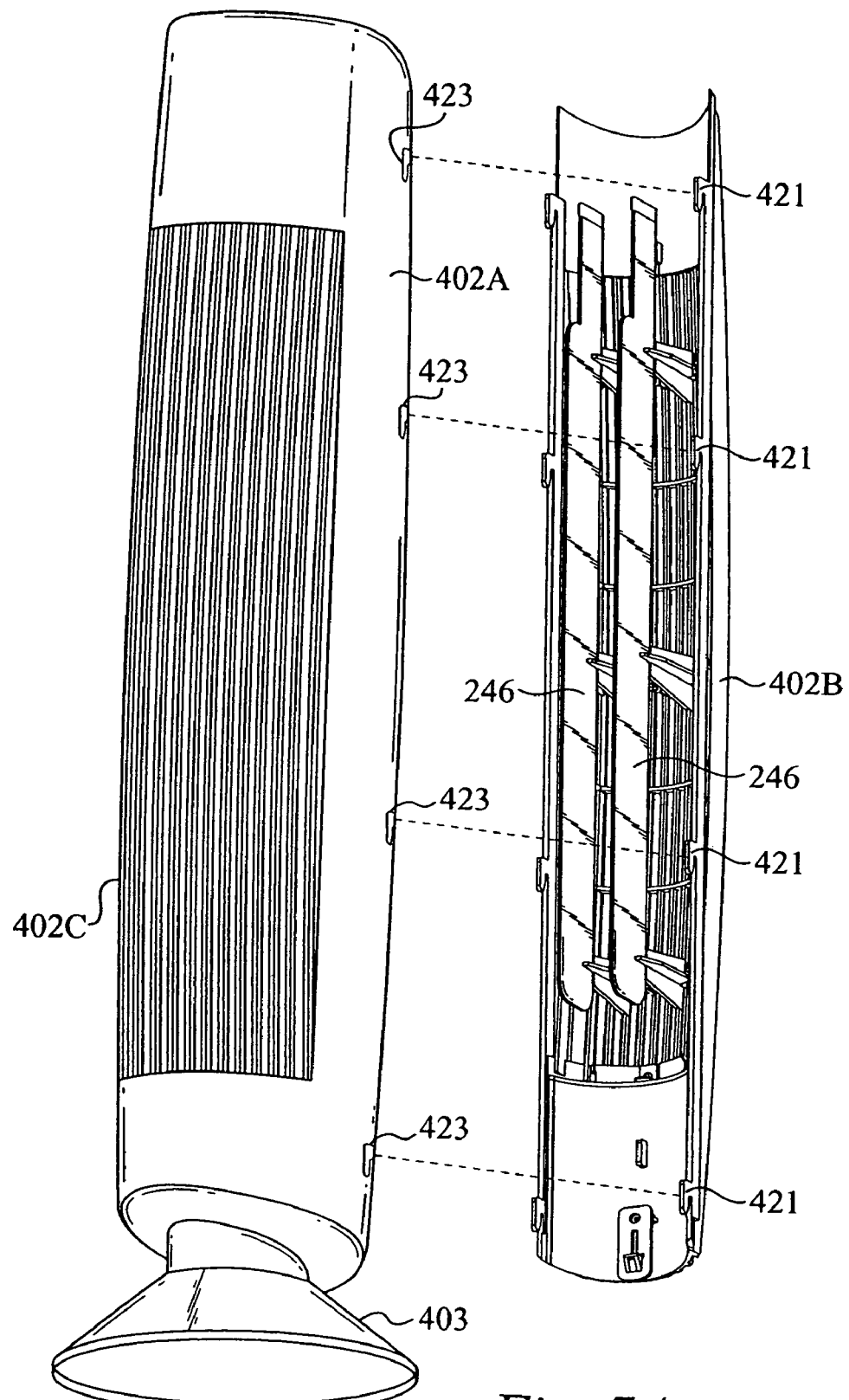
FIG. 7A illustrates an exploded view of the air conditioner system in accordance with one embodiment of the present invention.

The exhaust grill 402B and intake grill 402C preferably include fins which run longitudinally or vertically along the length of the upstanding housing 402A as shown in FIGS. 6 and 7A. However, it is contemplated by one skilled in the art that the fins are configured in any other direction and are not limited to the vertical direction.

In one embodiment shown in FIG. 7A, the driver electrodes are removable by removing the exhaust grill 402B from the housing 402A. The removable exhaust grill 402B allows the user convenient access to the electrode assembly 420 as well as to the driver electrodes 246 to clean the electrode assembly 420 and/or other components. The exhaust grill 402B is removable either partially or completely from the housing 402A as shown in FIG. 7A. In particular, the exhaust grill 402B includes several L-shaped coupling tabs 421 which secure the exhaust grill 402B to the housing 402A. The housing 402A includes a number of receiving slots 423 which are positioned to receive and engage the L-shaped coupling tabs 421 when the exhaust grill 402B is coupled to the housing 402A. The exhaust grill 402B is removed from the housing 402A by lifting the exhaust grill 402B in an upward, vertical direction relative to the housing 402A to raise the L-shape coupling tabs 421 from the corresponding engaging slots 423 on the housing 402A. Once the L-shaped coupling tabs 421 are disengaged, the user is able to pull the exhaust grill 402B laterally away from the housing 402A to expose the electrode assembly 420 within the housing 402A. In one embodiment, the exhaust grill 402B is coupled to the housing 402A by any alternative mechanism. For example only, the exhaust grill 402B is attached to the housing 402A on a set of hinges, whereby the exhaust grill 402B pivotably opens with respect to the housing 402A to allow access to the electrode assembly. It is preferred that the driver electrodes 246 and collector electrodes 242 are configured to allow the collector electrodes 242 to be vertically lifted while the driver electrodes 246 remain within the housing 402A.

Figure 7B:
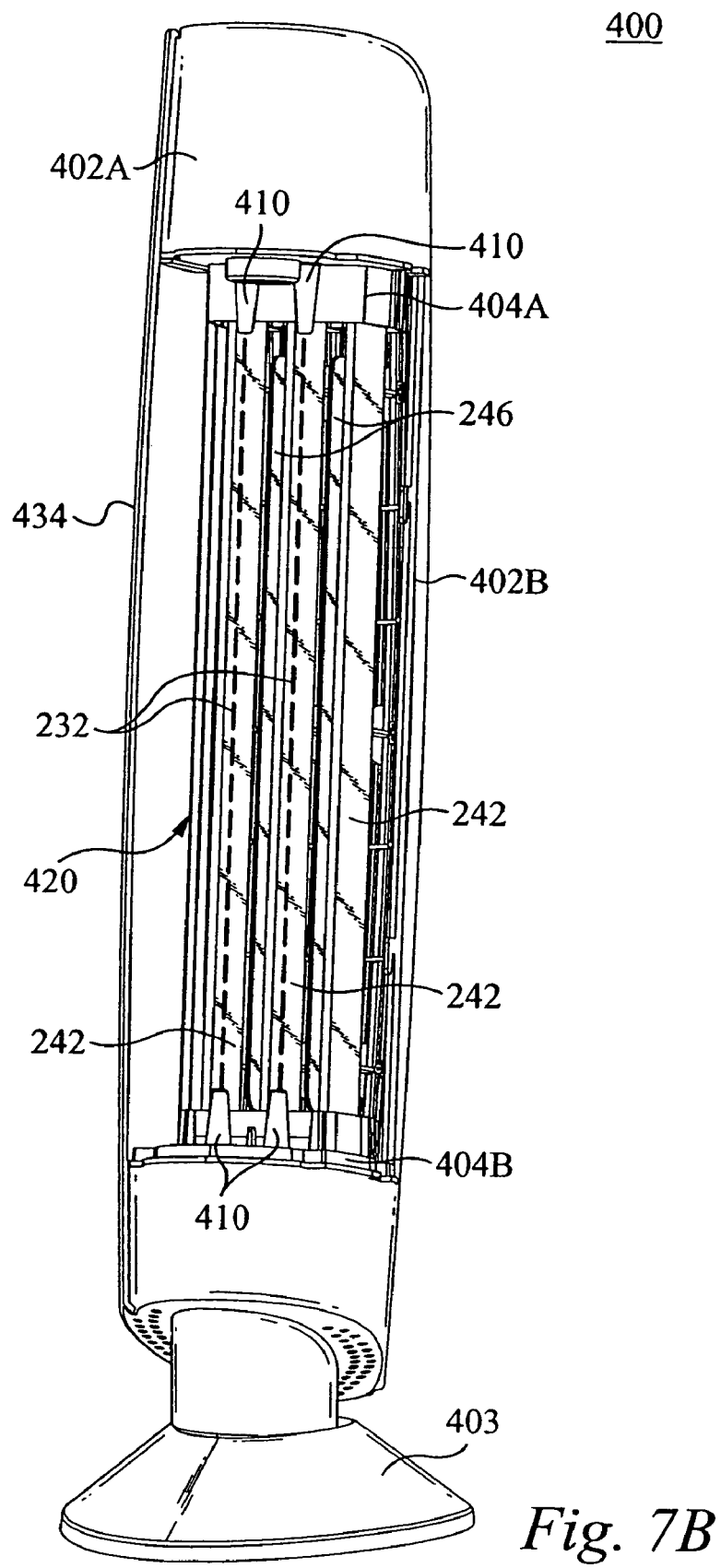
FIG. 7B illustrates a perspective cutaway view of the air conditioner system in accordance with one embodiment of the present invention.

FIG. 7B illustrates a cutaway view of the back end 434 of the air conditioner device 400 in accordance with one embodiment of the present invention. As shown in FIG. 7B, the electrode assembly 420 is positioned within the housing 402A and the exhaust grill 402B is coupled thereto. As shown in FIG. 7B, the collector electrodes of the electrode assembly 420 preferably includes a top mount 404A, a bottom mount 404B, and several collector electrodes 242, 246 positioned therebetween. In particular, a number of collector electrodes 242 are coupled to the top mount 404A and the bottom mount 404B and positioned therebetween. The collector electrodes 242 are preferably positioned parallel to one another. In addition, as shown in FIG. 7B, two driver electrodes 246 are located within the housing 402A and positioned in between the parallel collector electrodes 242. The collector electrodes 242 and driver electrodes 246 are positioned proximal to the exhaust grill 402B to cause the air to flow out of the unit 400 through the exhaust grill 402B. In addition the electrode assembly 420 includes one or more emitter electrodes which are attached to the emitter electrode pillars 410 disposed on the top and bottom mounts 404A, 404B, respectively. The emitter electrodes are shown in dashed lines in FIG. 7B for clarity purposes.

Figure 8A:
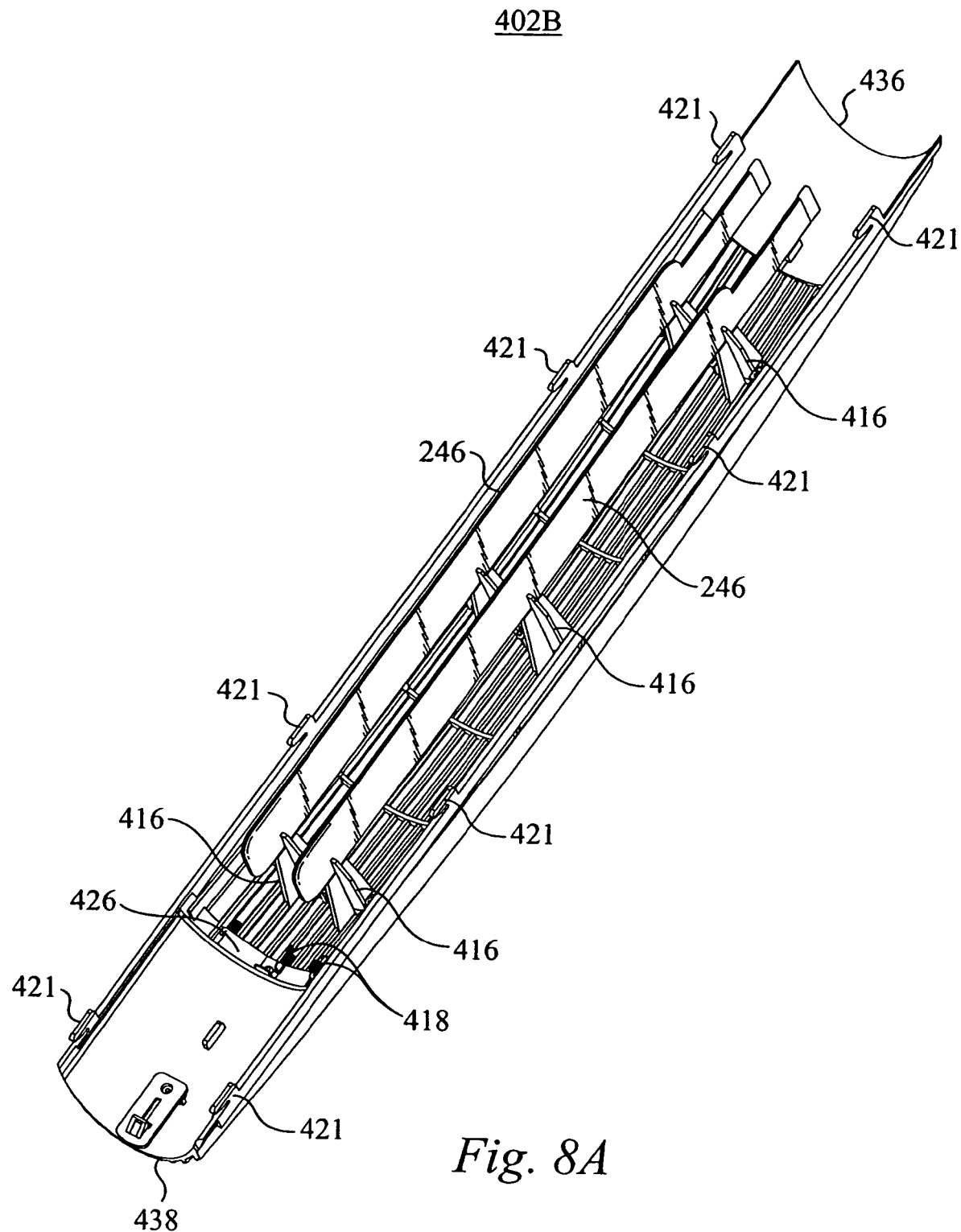
FIG. 8A illustrates a perspective view of the front exhaust grill with the driver electrodes coupled thereto in accordance with one embodiment of the present invention.

FIG. 8A illustrates a perspective view of the removable exhaust grill 402B in accordance with one embodiment of the present invention. As shown in FIG. 8A, the exhaust grill 402B includes a top end 436 and a bottom end 438. The grill 402B preferably has a concave shape. In one embodiment, the length of the exhaust grill 402B is substantially the height of the elongated housing 402A, although it is not necessary. The driver electrodes 246 are securely coupled to one or more clips 416 disposed on the interior surface of the exhaust grill 402B as shown in FIG. 8A. The clips 416 are located on the inside of the exhaust grill 402B to position the driver electrodes 246 preferably in between the collector electrodes 242, as discussed above, when the grill 402B is coupled to the body 402A. The driver electrodes 246 are removably coupled to the clips 416 by a friction fit in one embodiment. The driver electrodes 246 are removable from the clips by any other method or mechanism. In one embodiment, the driver electrodes 246 are not removable from the clips 416 of the exhaust grill 402B.

The driver electrodes 246 are preferably coupled to the negative terminal (FIG. 7B) or ground of the high voltage generator 170 (FIG. 3A) via a pair of conductors located on the top base component 404A and/or bottom base component 404B. Alternatively the conductors are positioned elsewhere in the device 400. The conductors provide voltage to or ground the driver electrodes 246 when the exhaust grill 402B is coupled to the housing portion 402A. The conductors come into contact with the driver electrodes 246 when the exhaust grill 402B is coupled to the housing 402A. Thus, the driver electrodes 246 are energized or grounded when the exhaust grill 402B is secured to the housing 402A. In contrast, the driver electrodes 246 are not energized when the exhaust grill 402B is removed from the housing 402A, because the driver electrodes 246 are not in electrical contact with the conductors. This allows the user to clean the driver electrodes 246. It is apparent to one skilled in that art that any other method is alternatively used to energize the driver electrode 246.

Figure 8B:
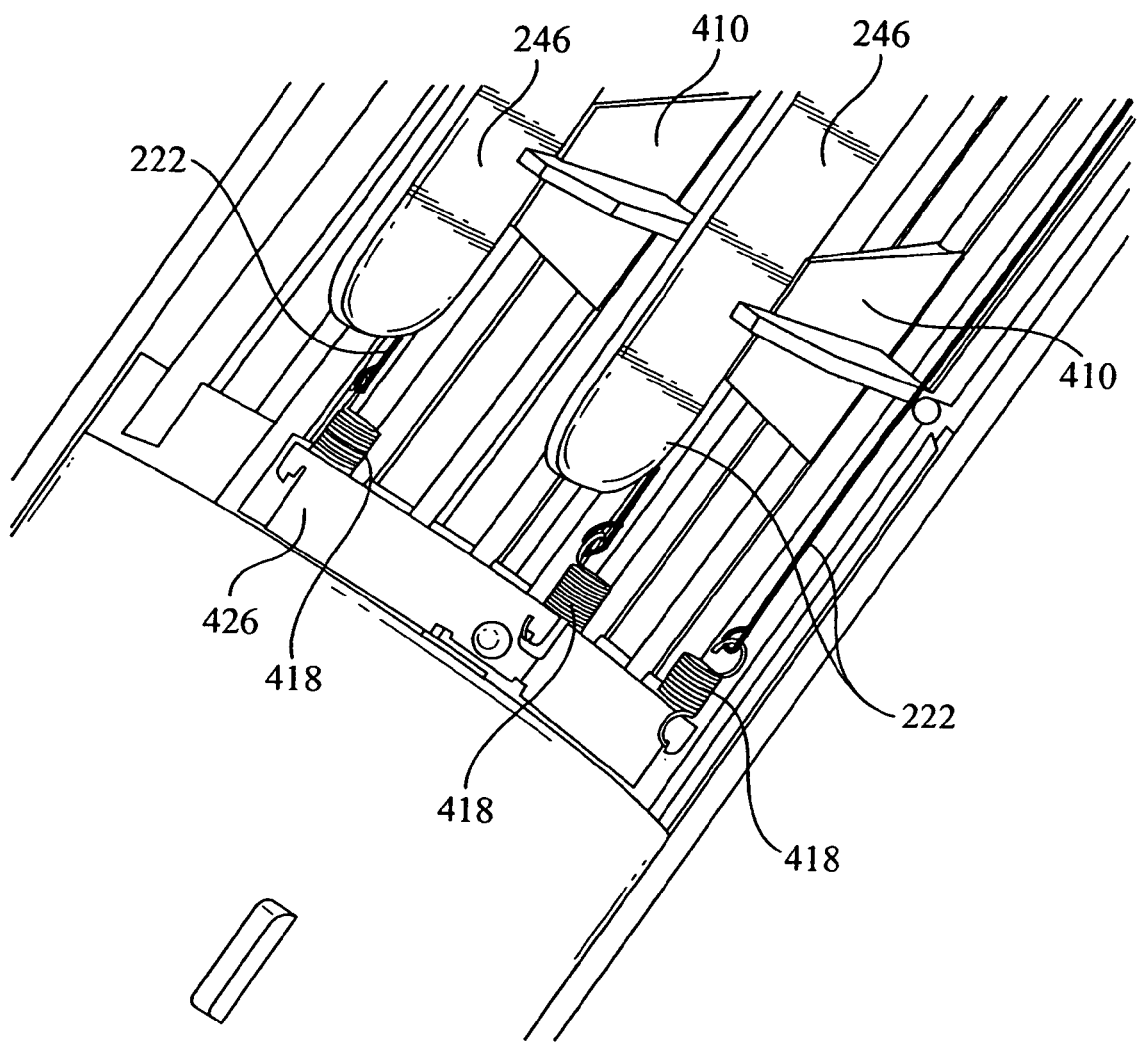
FIG. 8B illustrates a detailed view of the embodiment shown in FIG. 8A in accordance with one embodiment of the present invention.

In one embodiment, the grill 402B includes the set of trailing electrodes 222 which are disposed downstream of the driver electrodes 246 and near the inner surface of the exhaust grill 402B. An illustration of the trailing electrodes 222 is shown in FIG. 8B. It should be noted that the trailing electrodes 222 are present in FIG. 8A, although not shown for clarity purposes. In the embodiment that the driver electrodes 246 are removable from the exhaust grill 402B, the user is able to access to the trailing electrodes 222 for cleaning purposes. In another embodiment, driver electrodes 246 are not removable and the trailing electrodes 222 include a cleaning mechanism such as a slidable member or the like such as by way of example, a bead (not shown), as described above with respect to cleaning the emitter electrodes 232 in U.S. Pat. Nos. 6,350,417 and 6,709,484, which are incorporated by reference above The trailing electrodes 222 are preferably secured to the interior of the exhaust grill 402B by a number of coils 418, as shown in FIGS. 8A and 8B. As shown in FIGS. 8A and 8B, the coils 418 and the trailing electrodes 222 are preferably coupled to an attaching member of 426. The attaching member 426 is secured to the inner surface of the exhaust grill 402B, whereby the attaching member 426 and electrodes 222 remain with the grill 402B when the grill 402B is removed from the housing 402A. Although not shown in the figures, the present invention also includes a set of coils 418 also positioned near the top 436 of the exhaust grill 402B, whereby the coils 418 hold the trailing electrodes 222 taut against the inside surface of the exhaust grill 402B. Alternatively, the length of the trailing electrodes 222 are longer than the distance between the coils 418 on opposite ends of the exhaust grill 402B. Therefore, the trailing electrodes 222 are slack against the inside surface of the exhaust grill 402B. Although three sets of coils 418 and three trailing electrodes 222 are shown in FIGS. 8A and 8B, it contemplated that any number of trailing electrodes 222, including only one trailing electrode, is alternatively used.

The attaching member 426 is preferably conductive and electrically connects the trailing electrodes 222 to the high voltage generator 172 (FIG. 3A) when the exhaust grill 402B is coupled to the housing 402A. The attaching member 426 comes into contact with a terminal of the high voltage generator 170 when the exhaust grill 402B is coupled to the housing 402A. Thus, the trailing electrodes 222 are energized when the exhaust grill 402B is secured to the housing 402A. In contrast, the trailing electrodes 222 are not energized when the exhaust grill 402B is removed from the housing 402A, because the attaching member 426 is not in electrical contact with the generator 172. This allows the user to clean the trailing electrodes 222. It is apparent to one skilled in that art that any other method is alternatively used to energize the trailing electrodes 222.

Although the trailing electrodes 222 are shown coupled to the interior surface of the exhaust grill 402B, the trailing electrodes 222 are alternatively configured to be free-standing downstream from the collector electrodes 242. Thus, the trailing electrodes 222 remain stationary with respect to the housing 402A when the exhaust grill 402B and/or the collector electrodes of the electrode assembly 420 is removed from the unit 400. In one embodiment, the freestanding trailing electrodes 222 are attached to a set of brackets, whereby the brackets are removable from within the housing 402A. Alternatively, the brackets are secured to the housing, and the trailing electrodes 222 are not removable from within the housing 402A.

In operation, once the exhaust grill 402B is removed from the housing 402A, the user is able to remove the driver electrodes 246 from the clips 416 by simply pulling on the driver electrodes 246. Alternatively, the driver electrodes 246 are disengaged from the clips 416 by any other appropriate known method or mechanism. Alternatively, the driver electrodes 246 are secured to the exhaust grill 402B and can be cleaned as secured to the exhaust grill 402B. As stated above, in one embodiment, the user is also able to clean the trailing electrodes 222 (FIG. 8B) once the driver electrodes 246 are disengaged from the clips 416.

With the exhaust grill 402B removed, the electrode assembly 420 within the housing 402A is exposed. In one embodiment, the user is able to clean the emitter 232 and the collector electrodes 242 while the electrodes are positioned within the housing 402A. In one embodiment, the user is able to vertically lift the handle 406 and pull the collector electrodes 240 of the electrode assembly 420 telescopically out through the upper portion of the housing 402A without having to remove the exhaust grill 402B. The user is thereby able to completely remove the collector electrodes 240 of the electrode assembly 420 from the housing portion 402A and have complete access to the collector electrodes 242. Once the collector electrodes 242 are cleaned, the user is then able to re-insert the collector electrodes 240 of the electrode assembly 420 vertically downwards, with the assistance of gravity, into the housing portion of 402A until the collector electrodes 240 of the electrode assembly 420 is secured inside the housing portion 402A. With the driver electrodes 246 secured to the exhaust grill 402B, the user is able to couple the exhaust grill 402B to the housing portion 402A in the manner discussed above. Thus, it is apparent that the collector electrodes 240 of the electrode assembly 420 and the exhaust grill 402B are independently removable from the housing 402A to clean the electrodes. In one embodiment, the electrode assembly 420 includes a mechanism which includes a flexible member and a slot for capturing and cleaning the emitter electrode 232 whenever the electrode assembly 420 is inserted and/or removed. More detail regarding the mechanism is provided in U.S. Pat. No. 6,709,484 which was incorporated by reference above.

Figures 9A, 9B:
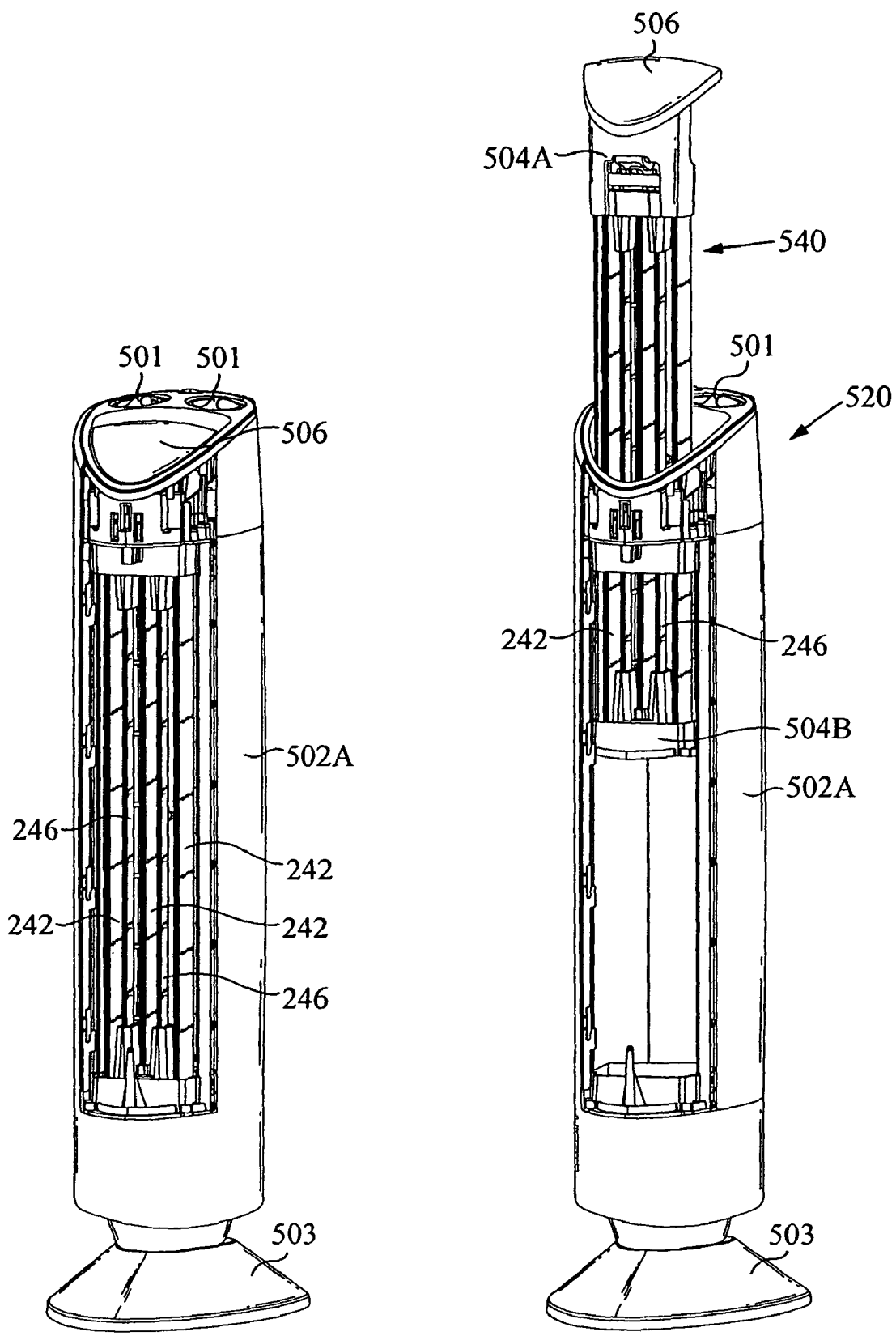
FIG. 9A illustrates a perspective view of the air conditioner system with an electrode assembly positioned therein.
FIG. 9B illustrates a perspective view of the air conditioner system with an electrode assembly partially removed in accordance with one embodiment of the present invention.

FIGS. 9A and 9B illustrate another embodiment of the air conditioner device 500 in accordance with the present invention. The embodiment shown in FIG. 9A is similar to the device 400 described in FIGS. 6-8B. However, the driver electrodes 246 in the embodiment shown in FIGS. 9A-10B are removably secured to the collector electrode assembly 540 and are removable from the housing 502A with the collector electrode assembly 540. In one embodiment, the exhaust grill is not removable from the housing portion 502A. In another embodiment, the exhaust grill is removable from the housing portion 502A in the manner described above in regards to FIGS. 6-8B.

In the embodiment shown in FIGS. 9A-100B, the collector electrode assembly 540 is removable from the unit 500 by lifting the handle 506 in a vertical direction and pulling the collector electrode assembly 540 telescopically out of the housing 502A. The driver electrodes 246 are then removable from the collector electrode assembly 540 after the collector electrode assembly 540 has been removed from the unit 500, as will be discussed below.

FIG. 10A illustrates a perspective view of the collector electrode assembly 540 in accordance with the present invention. As shown in FIG. 10A, the collector electrode assembly 540 comprises the set of collector electrodes 242 and the set of driver electrodes 246 positioned adjacent to the collector electrodes 242. As shown in FIG. 10A, the collector electrodes 242 are coupled to a top mount 504A and a bottom mount 504B, whereby the mounts 504A, 504B preferably arrange the collector electrodes 242 in a fixed, parallel configuration. The liftable handle 506 is coupled to the top mount 504A. The top and bottom mounts 504A, 504B are designed to allow the collector electrodes 242 to be inserted and removed from the device 500. The top and/or the bottom mounts 504A, 504B include one or more contact terminals which electrically connect the collector electrodes 242 to the high voltage source 170 when the collector electrodes 242 are inserted in the housing 502A. It is preferred that the contact terminals come out of contact with the corresponding terminals within the housing 502A when the collector electrodes 242 are removed from the housing 502A.

Figure 10B:
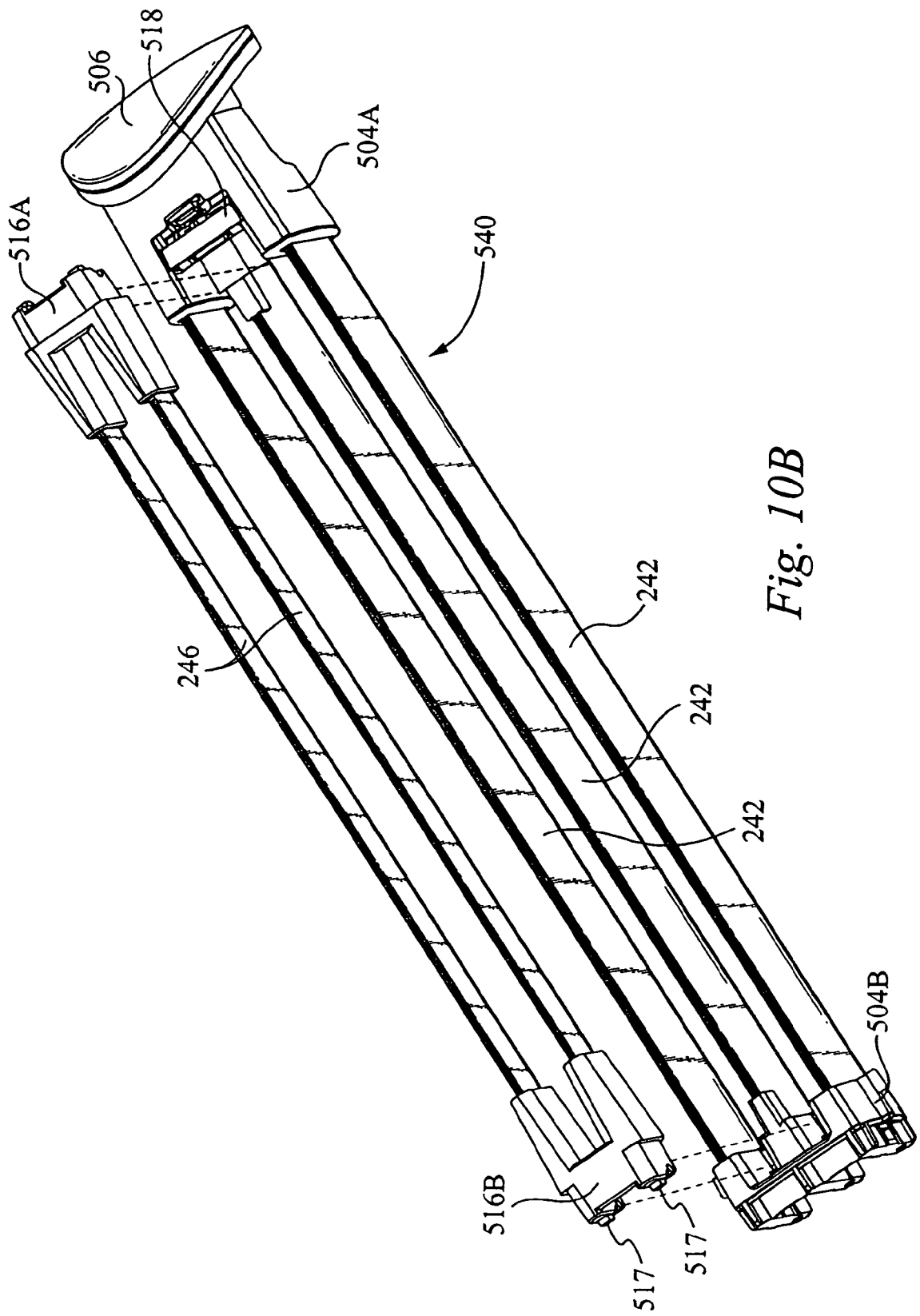
FIG. 10B illustrates an exploded view of an electrode assembly in accordance with one embodiment of the present invention.

In the embodiment shown in FIG. 10A, three collector electrodes 242 are positioned between the top mount 504A and the bottom mount 504B. However, any number of collector electrodes 242 are alternatively positioned between the top mount 504A and the bottom mount 504B. The collector and driver electrodes 242, 246, as shown in FIGS. 10A and 10B, are preferably symmetrical about the vertical axis, which is designated as the axis parallel to the electrodes 242, 246 in one embodiment. Alternatively, or additionally, the collector and driver electrodes 242, 246 are symmetrical about the horizontal axis, which is designated as the axis perpendicular and across the electrodes 242, 246. It is apparent to one skilled in the art that the electrode assembly is alternatively non-symmetrical with respect to the vertical and/or the horizontal axis.

In addition as shown in FIG. 10A, a set of driver electrodes 246 are positioned between a top driver mount 516A and a bottom driver mount 516B. Although two driver electrodes 246 are shown between the top driver mount 516A and a bottom driver mount 516B, any number of driver electrodes 246, including only one driver electrode, is contemplated. The top driver mount 516A and bottom driver mount 516B are configured to allow the driver electrodes 246 to be removable from the collector electrodes 242, as discussed below. The top and bottom driver mounts 516A and 516B preferably include a set of contact terminals which deliver voltage from the high voltage pulse generator 170 (FIGS. 4 and 5) to the driver electrodes 246 when the driver electrodes 246 are coupled to the collector electrodes 242. Alternatively, the driver electrodes 246 are grounded. Accordingly, the top and/or bottom driver mounts 516A, 516B include contact terminals which come into contact with the contact terminals of the mount(s) 504 when the driver electrodes 246 are coupled to the collector electrodes 242.

The collector electrode assembly 540 includes a release mechanism 518 located in the top mount 504A in one embodiment. The release mechanism 518, when depressed, releases the locking mechanism which secures the top and bottom driver mounts 516A, 516B to the top and bottom mounts 504A, 504B. Any appropriate type of locking mechanism is contemplated and is well known in the art. In one embodiment, the release mechanism 518 unfastens the top driver mount 516A from the collector electrode assembly 540, allowing the top driver mount 516A to pivot out and release the bottom driver mount 516B from a protrusion that the bottom driver mount 516B is fitted over and held in place by. Thus, the driver electrodes 246 are removable as shown in FIG. 10B. Alternatively, the bottom driver mount 516B includes protrusions 517 that can retain the driver electrodes in the bottom mount 504B of the collector electrode array 540. In another embodiment, the driver electrodes 246 are removed from the collector electrode assembly 540 by being slid in a direction perpendicular to the elongated length of the collector electrode assembly 540 as shown in FIG. 10B. It is apparent that the release mechanism 518 is alternatively located elsewhere in the collector electrode assembly 540. As shown in FIG. 10B, the driver electrodes 246 are removable by lifting or pulling the driver electrodes 246 from the collector electrodes 242 upon activating the release mechanism 518. In particular, the top and/or bottom driver mounts 516A, 516B are lifted from the top and bottom mounts 504A, 504B, respectively. The removed driver electrodes 246 are then able to be easily cleaned. In addition, the removal of the driver electrodes 246 increases the amount of space between the collector electrodes 242, thereby allowing the user to easily clean the collector electrodes 242.

In one embodiment, securing the driver electrodes 246 to the top and bottom mounts 504A, 504B, the user aligns the bottom driver mount 516B with the bottom mount 504B. Once aligned, the user pivots the top driver mount 516A toward the top mount 504A until the locking mechanism engages the corresponding feature(s) in the top and/or bottom mounts. The driver electrodes 246 are then secured to the rest of the collector electrode assembly 540, whereby the electrode assembly 520 is then able to be inserted back into the housing 502A as one piece. In another embodiment, the driver electrodes 246 are secured to the top and bottom mounts 504A, 504B by aligning the top and bottom driver mounts 516A, 516B with the top and bottom mounts 504A, 504B and laterally inserting the top and bottom driver mounts 516A, 516B into the receptacles of the top and bottom mounts 504A, 504B until the locking mechanism engages the corresponding feature(s) in the top and/or bottom mounts 504A, 504B As stated above, the driver electrodes 246 are preferably symmetrical about the vertical and/or horizontal axis. In one embodiment, the top and bottom driver mounts 516A, 516B are configured such that the driver electrodes 246 are able to be reversibly coupled to the top and bottom mounts 504A, 504B. Thus, the bottom driver mount 516B would couple to the top mount 504A, and the top driver mount 516A would couple to the bottom mount 504B. This feature allows the driver electrodes 246 to properly operate irrespective of whether the driver electrodes 246 are right-side-up or upside down. In another embodiment, less than all of the driver electrodes 246 are removable from the mounts 504A, 504B, whereby one or more of the driver electrodes 246 are independently removable from one another.

In another embodiment, the driver electrodes 246 removable from the collector electrodes 242 without first removing the entire collector electrode assembly 540 from the housing 502A. For example, the user can remove the exhaust grill 402B (FIG. 8A) and depress the release mechanism 518, whereby the driver electrodes 246 are pulled out through the front of the housing 502A. The user is then able to clean the collector electrodes 242 still positioned with the housing 502A. The user is also alternatively able to then lift the collector electrodes 242 out of the housing 502A by lifting the handle 506 as discussed above.

The foregoing description of preferred and alternative embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:
1. An air-conditioning device comprising:
a housing;
a first high voltage source in the housing;
a second high voltage source in the housing;
an ion generator in the housing, the ion generator comprising:
at least one emitter electrode and a plurality of collector electrodes, wherein the emitter electrode and the collector electrodes are coupled to opposite terminals of the first high voltage source; and
at least one trailing electrode located downstream from the collector electrodes, the trailing electrode is coupled to the second high voltage source; and
a controller operable to independently control the first high voltage source and the second high voltage source to allow variable increase or decrease of the amount of negative ions output by the trailing electrode without correspondingly increasing or decreasing the amount of voltage provided to the emitter electrodes and the collector electrodes.

2. The device of claim 1, further comprising at least two driver electrodes interposed between the collector electrodes, the driver electrodes connected to the ground.

3. The device of claim 1, further comprising a germicidal lamp within the housing.

4. The device of claim 2, wherein the driver electrodes are insulated.

5. The device of claim 2, wherein the driver electrodes are coated with an ozone reducing catalyst.

6. The device of claim 1, wherein the controller is operable to independently control duty cycle, amplitude, pulse width and frequency of the first and second high voltage sources.

7. The device of claim 1, wherein the controller is operable to control operation of the second voltage source so that trailing electrodes emit ions for a predetermined period of time.

8. An air-conditioning device comprising:
at least two high voltage sources;
at least one emitter electrode coupled to positive terminal of a first high voltage source of the at least two high voltage sources;
a plurality of collector electrodes coupled to negative terminal of the first high voltage source;
at least one trailing electrode located downstream from the collector electrodes, the trailing electrode is coupled to negative terminal of a second high voltage source of the at least two high voltage sources; and
a controller operable to independently control the first high voltage source and the second high voltage source to allow variable increase or decrease of the amount of negative ions output by the trailing electrode without correspondingly increasing or decreasing the amount of voltage provided to the emitter electrodes and the collector electrodes.

9. The device of claim 8, further comprising a plurality of driver electrodes interposed between the collector electrodes, the driver electrodes are connected to the ground.

10. The device of claim 8, further comprising a germicidal lamp.

11. The device of claim 9, wherein the driver electrodes are insulated.

12. The device of claim 9, wherein the driver electrodes are coated with an ozone reducing catalyst.

13. The device of claim 8, wherein the controller is operable to independently control duty cycle, amplitude, pulse width and frequency of the first and second high voltage sources.

14. The device of claim 8, wherein the controller is operable to control operation of the second voltage source so that trailing electrodes emit ions for a predetermined period of time.

15. An air-conditioning device comprising:

at least two high voltage sources;

at least one emitter electrode coupled to positive terminal of a first high voltage source of the at least two high voltage sources;

a plurality of collector electrodes coupled to negative terminal of the first high voltage source; and a plurality of insulated driver electrodes interposed between the collector electrodes, the driver electrodes are coupled to the ground; and at least one trailing electrode located downstream from the collector electrodes, the trailing electrode is coupled to negative terminal of a second high voltage source of the at least two high voltage sources to generate negative ions in the air.

16. The device of claim 15, further comprising a germicidal lamp.

17. The device of claim 15, further comprising a controller operable to independently control the first high voltage source and the second high voltage source to allow variable increase or decrease of the amount of negative ions output by the trailing electrode without correspondingly increasing or decreasing the amount of voltage provided to the emitter electrodes and the collector electrodes.

18. The device of claim 17, wherein the controller is operable to independently control duty cycle, amplitude, pulse width and frequency of the first and second high voltage sources.

19. The device of claim 15, wherein the driver electrodes are coated with an ozone reducing catalyst.

20. The device of claim 17, wherein the controller is operable to control operation of the second voltage source so that trailing electrodes emit ions for a predetermined period of time.

* * * * *